United States Patent
Ogren et al.

(10) Patent No.: US 9,201,869 B2
(45) Date of Patent: Dec. 1, 2015

(54) CONTEXTUALLY BLIND DATA CONVERSION USING INDEXED STRING MATCHING

(71) Applicant: Oracle International Corporation, Redwood City, CA (US)

(72) Inventors: Philip Ogren, Boulder, CO (US); Luis Rivas, Denver, CO (US); Edward A. Green, Englewood, CO (US)

(73) Assignee: Oracle International Corporation, Redwood City, CA (US)

( * ) Notice: Subject to any disclaimer, the term of this patent is extended or adjusted under 35 U.S.C. 154(b) by 301 days.

(21) Appl. No.: 13/899,383

(22) Filed: May 21, 2013

(65) Prior Publication Data

US 2014/0067363 A1 Mar. 6, 2014

Related U.S. Application Data

(63) Continuation-in-part of application No. 13/596,844, filed on Aug. 28, 2012, now Pat. No. 9,070,090.

(51) Int. Cl.
*G06F 17/28* (2006.01)
*G06F 17/22* (2006.01)

(52) U.S. Cl.
CPC ............ *G06F 17/28* (2013.01); *G06F 17/2282* (2013.01)

(58) Field of Classification Search
CPC ...................................... G06F 17/28
See application file for complete search history.

(56) References Cited

U.S. PATENT DOCUMENTS

| 7,536,634 | B2 | 5/2009 | Green et al. | |
| 7,865,358 | B2 | 1/2011 | Green et al. | |
| 8,199,985 | B2 | 6/2012 | Jakobsson et al. | |
| 8,396,859 | B2 | 3/2013 | Green et al. | |
| 8,700,383 | B2 * | 4/2014 | Sneddon et al. | 704/4 |
| 8,886,517 | B2 * | 11/2014 | Soricut et al. | 704/2 |
| 2009/0281732 | A1 | 11/2009 | Turnbull | |
| 2010/0077011 | A1 | 3/2010 | Green et al. | |
| 2011/0093467 | A1 | 4/2011 | Sharp et al. | |

FOREIGN PATENT DOCUMENTS

WO  9848360 A1  10/1998

OTHER PUBLICATIONS

Lin, Dekang, "An Information-Theoretic Definition of Similarity", ICML '98 Proceedings of the Fifteenth International Conference on Machine Learning, Morgan Kaufmann Publishers Inc., San Francisco, CA, USA, pp. 296-304(1998).

(Continued)

*Primary Examiner* — Alan Chen
(74) *Attorney, Agent, or Firm* — Marsh Fischmann & Breyfogle LLP

(57) ABSTRACT

Computer-based tools and methods for conversion of data from a first form to a second form without reference to the context of data to be converted. The conversion may be facilitated by matching source data with external information (e.g., public and/or private schema) that contain rules (e.g., context specific rules) for conversion of the data. The matching may be performed based on an optimized index string matching technique that may be operable to match source data to external information that is context dependent without specific identification of the context of either the source data or the external information identified. Accordingly, the conversion of data may be performed in an unsupervised machine learning environment.

20 Claims, 20 Drawing Sheets

(56) References Cited

OTHER PUBLICATIONS

Chen, Li et al., "Efficient Merging and Filtering Algorithms for Approximate String Searches", Data Engineering, 2008. ICDE 2008. IEEE 24th International Conference on, IEEE, Piscataway, NJ, USA, Apr. 7, 2008, pp. 257-266, XPO31245983, ISBN: 978-1-4244-1836-7.

Naoaki Okazaki et al., "Simple and Efficient Algorithm for Approximate Dictionary Matching", Proceedings of the 23rd International Conference on Computational Linguistics, Aug. 2010, pp. 851-859, XP055094147, Retrieved from the Internet: URL:http://www.aclweb.org/anthology/C10-1096.pdf.

Miller Ethan et al., "Performance and Scalability of a Large-Scale N-gram Based Information Retrieval System", Internet Citation, 2000, XP007903178, Retrieved from the Internet: URL:http//citeseer.ist.psu.edu/cache/papers/cs/15866/http:zSzzSzwww.cse.ucsc.eduzSz~elmzSzPaperszSztelltale.JODI.pdf/miller00performance.pdf.

Notification of Transmittal of the International Search Report and the Written Opinion of the International Searching Authority, or the Declaration, Mailing Date Jan. 7, 2014, pp. 1-13.

\* cited by examiner

ACME Brand 9 Volt Batteries, 2/PK
ACME Brand 9 Volt Batteries, 4/Pack
ACME Brand AA Batteries, 12/Pack
ACME Brand AA Batteries, 16/Pack
ACME Brand AA Batteries, 2/Pack
ACME Brand AA Batteries, 4/PK
ACME AA Batteries, 8/Pack
ACME Brand AA Batteries, 96/Carton
ACME Brand AAA Batteries, 12/Pack
ACME AAA Batteries, 16/Pack
ACME Brand AAA Batteries, 2/Pack
ACME Brand AAA Batteries, 4/Pack
ACME Brand AAA Batteries, 48/CRT
ACME Brand AAA Batteries, 8/Pack
ACME Brand C Batteries, 4/Pack
ACME Brand C Batteries, 8/Pack
ACME Brand D Batteries, 4/PK
ACME D Batteries, 72/Carton
ACME Brand D Batteries, 8/PCK
ACME Brand ULTRA-VOLT AA Batteries, 4/Pack
ACME Brand ULTRA-VOLT AAA Batteries, 4/Pack
ACME Brand Ultravolt Batteries, D, 1
ACME Brand Ultra 9 V Batteries, 2/Pack
ACME Brand Ultra AA Batteries, 4/Carton
ACME Brand Ultra AA Batteries, 8/Pack
ACME Ultra AAA Batteries, 4/PCK
ACME Ultra AAA Batteries, 8/Pack
ACME Brand Ultra AAAA Batteries, 2/Pack
ACME Brand Ultra C Batteries, 4/Pack
ACME Brand Ultra D Batteries, 4/Pack

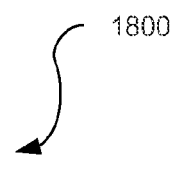

FIG. 18

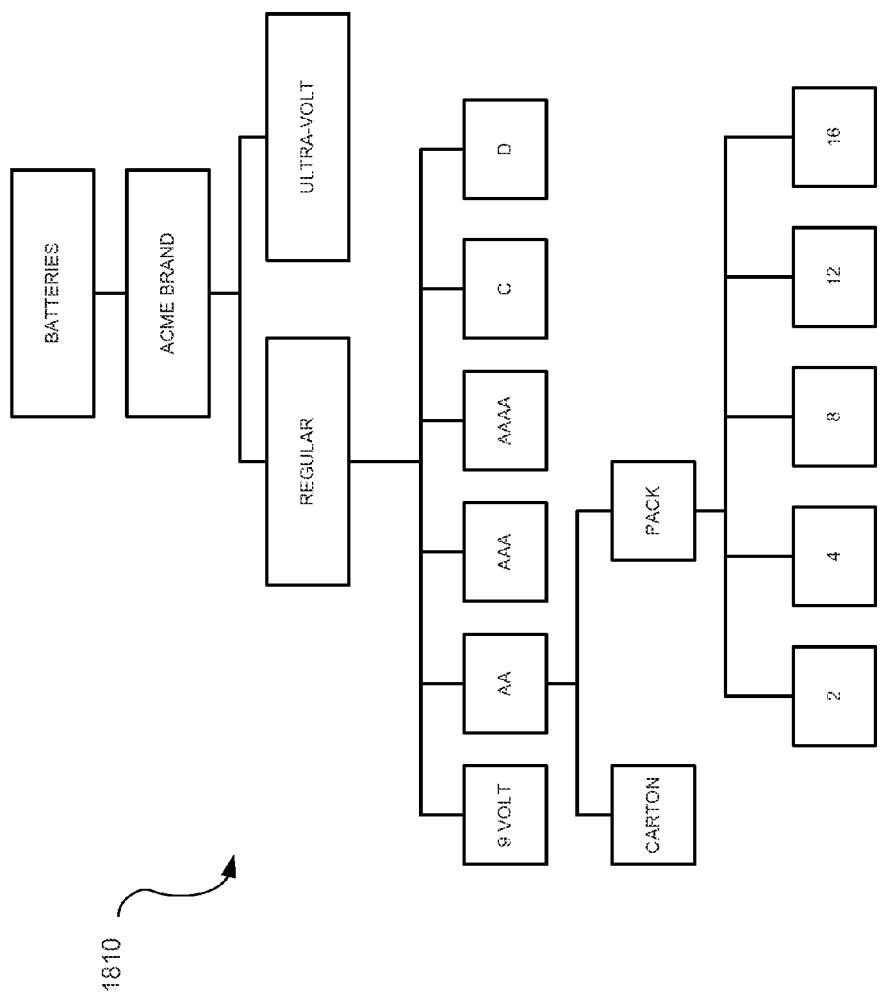

CONTEXTUALLY BLIND DATA CONVERSION USING INDEXED STRING MATCHING

CROSS REFERENCE TO RELATED APPLICATIONS

This application is a continuation-in-part of U.S. patent application Ser. No. 13/596,844 entitled "SCALABLE STRING MATCHING AS A COMPONENT FOR UNSUPERVISED LEARNING IN SEMANTIC META-MODEL DEVELOPMENT" filed on Aug. 28, 2012, the entirely of which is hereby incorporated by reference in its entirety.

FIELD

The present disclosure is generally related to use of a computer-based tool to transform data from a first form to a second form, and in particular to a computer-based tool that may utilize indexed string matching in connection with an unsupervised learning process to convert contextually indeterminate data using a schema selected at least partially based on the indexed string matching of a contextually dependent schema to the source data for use in conversion of the source data.

BACKGROUND

In a variety of applications, it may be desirable to convert data from a first (or input) form to a second (or target) form. Such conversions may involve, for example, changes of data with respect to linguistics, syntax and/or formats. In this regard, linguistic differences may be due to the use of different languages or, within a single language, due to different uses of terminology, proprietary names, abbreviations, idiosyncratic phrasings or structures and other matter that is specific to a location, region, business entity or unit, trade, organization or the like. Also within the purview of linguistic differences for present purposes are different currencies, different units of weights and measures, and other systematic differences. Syntax may relate to the phrasing, ordering and organization of terms as well as grammatical and other rules relating thereto. Differences in format may relate to data structures or conventions associated with a database or other application and associated tools.

One or more of these differences in form may be advantageously addressed in connection with a conversion process. Some examples of conversion environments include: importing data from one or more legacy systems into a target system; correlating or interpreting an external input (such as a search query) in relation to one or more defined collections of information; correlating or interpreting an external input in relation to one or more external documents, files or other sources of data; facilitating exchanges of information between systems; and translating words, phrases or documents. In all of these cases, a machine-based (e.g., a computer-based) tool may be used to attempt to address differences in linguistics, syntax and/or formats between the input and target environments.

One difficulty associated with machine-based conversion tools relates to properly handling context dependent conversions. In such cases, properly converting a contextually dependent item under consideration may depend on understanding something about the context in which the item is used. For example, in the context of product descriptions, an attribute value of "one inch" might denote one inch in length, one inch in radius or some other dimension depending on the product under consideration. In this regard, the context in which "one inch" is used may dictate the permissible and/or proper conversion of the data "one inch" (e.g., into a length, radius, or other dimension). In another example, in the context of translation, the term "walking" functions differently in the phrase "walking shoe" than in "walking to work." Thus, in these examples and many others, understanding something about the context of an item under consideration may facilitate conversion.

Although the value of context in disambiguating or otherwise properly converting information is well recognized, limited success has been achieved in applying this notion to machine-based tools, especially in unsupervised machine learning. For example, certain data to be converted may be highly unstructured and/or otherwise contextually indeterminate. As such, the data may not have indicators (e.g., either internal to the data or available from external sources) that indicate the context in which source data is used. That is, the data may be contextually indeterminate such that the context of the data is not readily discernible. Furthermore, source data may include a plurality of different contexts such that the contexts of different subsets of the source may present in the data. In this regard, conversions that are contextually dependent may not be possible using traditional approaches of identification of context for use in the conversion of the contextually dependent data.

SUMMARY

In view of the foregoing, described herein are embodiments of a computer-based tool that may be utilized to perform "contextually blind" conversions of contextually dependent data. For example, embodiments described herein may be utilized to convert data that is contextually indeterminate, but contextually dependent, without first determining the context in which the data is used. That is, the context of the data may not be ascertainable for use in the conversion of the data. For example, contextually indeterminate data may include data for which no contextual clues are available, data having conflicting contextual clues, data having more contextual clues than can readily be identified, or some other property which makes accurate identification of the context of the data difficult or impossible.

In this regard, an indexed string matching process may be utilized to identify external information (e.g., schema) that are similar to the data to be converted based on related features rather than by matching contexts of the source data and schema. By matching the data to be converted with a related schema (e.g., a schema that includes conversion rules specific to a particular context), the contextually dependent data may be converted with regard to the context in which it is used even without determination of the context in which the data is used, thus being converted in a "contextually blind" manner. That is, while the context of the data may not be specifically determined prior to conversion, determination of a similar schema (e.g. by way of the indexed string matching process) may allow the data to be converted based on contextually dependent conversion rules even without identifying the context in which the source data is used.

In particular, embodiments described herein may identify contextually relevant schema applicable to data to be converted without regard to the context of the data to be converted or the context of the relevant schema. That is, embodiments may be operative to operate in a "contextually blind" manner that still results in identification of one or more schema that are contextually relevant to the source data even in the absence of knowledge regarding the context of the source data. In this regard, the present disclosure may be particularly apt for application in the context of machine learning, and in particular unsupervised machine learning where contextually indeterminate data, data without readily available context information, or data with many different contexts represented in the data are to be converted.

For example, data to be converted according to the methods and apparatuses described herein may be at least partially unstructured. As such, traditional approaches to supervised machine learning may be difficult to apply. For example, given the potential lack of data structure, there may be little or no quality training data to use in a supervised learning process. In this regard, to the extent the data is contextually related to a given subject matter, the context of the data may be obscured such that the context may not be readily ascertainable in a machine learning process. Accordingly, given the lack of readily ascertainable context information in combination with potentially contextually dependent conversion processes, such unstructured data to be converted may be difficult to convert from a first form to a second form without substantial intervention (e.g., by a human user). In this regard, the conversion of such unstructured data may be costly and/or inefficient to convert.

However, one approach described herein includes the use of indexed string matching to develop a similarity metric that, without reference to the context of the data to be converted or the schema available for use in conversion, is indicative of the commonality between data to be converted and a plurality of schema. Some embodiments of the string analysis tool may leverage advantages provided with both deterministic matching and fuzzy matching approaches to provide a rapid, domain independent process for analysis of strings (e.g., source data or schema).

Generally, a string analysis tool described herein may operable to represent strings (e.g., source data and/or schema) as features. The features of a source string may be compared to features of a target string to calculate the similarity metric between the source string and the target string. A similarity metric may be a quantitative measure (e.g., a numeric value) that is representative of the similarity between a source string and a target string. For instance, in an example, a similarity metric of 1 may represent an identical source string and target string and a similarity metric of 0 may represent a source string and target string that are completely dissimilar.

However, for very large target string corpuses, the calculation of a similarly metric for each target string in the corpus may require a large amount of computational resources such that the analysis may be cost and time prohibitive. Accordingly, a minimum similarity metric may be established that represents the minimum amount of similarity between a source string and a target string that is of interest in a particular process. The minimum similarity metric may be adjustable to tune the performance of the string analysis tool. In this regard, the minimum similarity metric may be a predefined value that may be established by a user. For instance, the higher the minimum similarity metric is, less computational resources may be required to perform the matching, yet the results may exclude certain results. The lower the minimum similarity metric is, greater computational resources may be required to perform the matching and the results may include more a comprehensive listing of matches. In any regard, the minimum similarity metric may be applied to the results to exclude certain matches from the results such that the minimum similarity metric serves as a minimum similarity metric threshold. The minimum similarity metric threshold may be used in an optimization process executable by the matching tool. For instance, matches with similarity values falling below the minimum similarity metric threshold may be excluded from the results and/or excluded from actual computation of the similarity metric for the match as will be described in greater detail below.

In this regard, one embodiment of the string analysis tool described herein may employ an optimization module that may reduce the number of similarity metrics that are calculated such that similarity metrics are only calculated for a portion of the target strings. The identification of target strings for which a similarity value to be calculated may be based on a predetermined minimum similarity metric threshold. Utilizing the minimum similarity metric threshold (e.g., derived from or corresponding to a user predetermined minimum similarity metric), this embodiment of the tool may identify features (e.g., of the source string and/or target string) that may be eliminated from consideration in the string analysis. For example, features may be eliminated from consideration based on a determination that the features to be eliminated cannot possibly return a similarity metric above the minimum similarity metric threshold.

In at least one embodiment presented in this disclosure, features of the target strings may be eliminated from consideration even before receipt of the source string. As such, at least some pre-computation may occur prior to receipt of the source string. Furthermore, features from the source string may be eliminated from consideration based on known parameters of the source features in the target strings. In this regard, an index may be compiled (e.g., precompiled prior to receipt of a source string) that includes information related to the distribution or frequency of features in the target strings. In an implementation, the index may be an inverted index that includes a mapping between each feature and target strings in which feature occurs. As such, the index may be employed to provide information related to features identified from the strings.

In this regard, the indexed string matching process may be used in number of respects in a data conversion tool. For instance, the indexed string matching process may return clustered portions of the source data that are similar. In this regard, for a large corpus of data to be converted with many potential contexts contained therein, the clustering of data may allow for data potentially provided in different contexts to be delineated. In this regard, delineated subsets of the source data may be individually matched to external data such that a specific context of a subset of the data may be utilized in the conversion. Accordingly, for large data sets comprising data corresponding to many contexts, the clustering may assist in identifications relevant subsets of the data.

Furthermore, as external data (e.g., schema including contextually dependent conversion rules) may be indexed prior to receipt of source data for conversion, a library of external data (e.g., schemas such as public or private schemas) with corresponding calculated indexes may be maintained for application to conversion of source data to be subsequently received. In this regard, upon receipt or identification of source data to be converted, the source data or a portion thereof may be rapidly compared to the external data in the preconfigured library to rapidly identify one or more portions of the schema to retrieve conversion rules corresponding to the schema that is identified as being similar to the source data with respect to features thereof. Importantly, the similarity of features may be performed using indexed string matching without explicitly discerning the context of the source data. Thus, an unsupervised machine learning tool employing embodiments described herein may need not specifically identify a context of the data or relevant training data. Rather, by matching the source data to schema with similar features as the source data, a contextually dependent conversion may be accomplished even in the absence of context or training data.

In this regard, a first aspect presented herein includes a method for use in operating a computer-based tool for converting data from a first form to a second form. The method includes identifying, using the computer-based tool, a set of data to be converted from the first form to the second form, wherein the set of data is contextually indeterminate. That is, the context of the set of data may be difficult or impossible to resolve (e.g., because no contextual clues are available, conflicting contextual clues are present, the data has more contextual clues than can readily be identified, etc.). The method further includes accessing, using the computer-based tool, a plurality of schema that each include one or more conversion rules for converting data within a particular context of the data, wherein the one or more conversion rules are at least partially based on the particular context. The method further includes comparing, using the computer-based tool, the set of data to at least a portion of the plurality of schema using indexed string matching that is performed independently of the context of the set of data and the plurality of schema. The method also includes selecting, using the computer-based tool, a selected schema from the plurality of schema based at least partially on the comparing and applying the one or more conversion rules of the selected schema to the set of data to convert the set of data from the first form to the second form.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the accessing may include identifying a public schema, including conversion rules generally applicable to the subject matter area independent of any entity or group of entities associated with the set of data, which establishes a structure for understanding at least a portion of a subject matter area. The public schema may include an accepted public definition of a semantic object. In contrast, the accessing may include identifying a private schema, including conversion rules specific to an entity or group of entities less than the public as a whole, which establishes a structure for understanding at least a portion of a subject matter.

In an embodiment, the indexed string matching may include representing each of the set of data and the plurality of schema as one or more features, wherein the set of data is represented as source features and the plurality of schema are represented as target features. The string matching may also include compiling an index corresponding to the target features, wherein the index comprises a mapping for each target feature to each of the plurality of schema containing the target feature. In turn, the matching may include determining a subset of the plurality of schema for which a similarity metric is to be calculated in relation to the set of data, wherein the subset of the plurality of schema comprises less than the entirety of the plurality of schema and calculating a similarity metric for the set of data relative to the subset of the plurality of schema, wherein the similarity metric is at least partially based on commonality between the target features and the source features.

In an embodiment, the method may include establishing, using the computer-based tool, a minimum similarity metric between the source string and the target strings and eliminating, using the computer based tool, source features from consideration in the determining operation at least partially based on the minimum similarity metric, wherein the eliminated source features correspond to target features of the subset plurality of schema that are not capable of exceeding the minimum similarity metric. Additionally or alternatively, the method may include establishing, using the computer-based tool, a minimum similarity metric between the source string and the target strings and removing, using the computer-based tool, at least one mapping from the index at least partially based on the minimum similarity metric, wherein the removing operation includes determining a portion of the target features that can be removed from the index such that only target features are included in the index that correspond with ones of the plurality of schema capable of exceeding the minimum similarity metric.

A second aspect includes a method for use in operating a computer-based tool for converting data from a first form to a second form that includes identifying a set of data to be converted from said first form to said second form, representing each one of the plurality of schema as one or more target features, and compiling an index corresponding to the plurality of schema, wherein the index comprises a mapping for each target feature to each of the plurality of schema containing the target feature. The method may also include representing the set of data to be converted as one or more source features and accessing a plurality of schema that are each based on external knowledge of at least one subject matter area independent of analysis of a particular data set to be converted, each one of the plurality of schema including one or more conversion rules for use in converting data within a corresponding context of a subject matter area of the schema. The method may further include determining a subset of the plurality of schema for which a similarity metric is to be calculated, wherein the subset of the plurality of schema comprises less than the entirety of the plurality of schema and calculating a similarity metric for the set of data to be converted relative to the subset of the plurality of schema, wherein the similarity metric is at least partially based on commonality between the target features and the source features. The method may further include selecting at least one selected schema of the plurality of schema at least partially based on the similarity metric and using an included conversion rule of the sat least one selected schema in a process for converting the set of data from the first form to the second form.

A number of feature refinements and additional features are applicable to the second aspect. These feature refinements and additional features may be used individually or in any combination. As such, each of the following features that will be discussed may be, but are not required to be, used with any other feature or combination of features of the second aspect.

In an embodiment, the subset of the plurality of schema for which a similarity metric is calculated at least comprises one target feature in common with at least one source feature. The method may also include assigning a feature weight to each feature, wherein the feature weight of the feature corresponds to a measure of the contribution of the feature to the similarity metric, and wherein the source features are assigned a source feature weight and the target features are assigned a target feature weight, and wherein the source feature weight is different than the target feature weight. The feature weight may at least partially based on a frequency of the feature in the plurality of schema, wherein a feature having a frequency above an upper threshold or a frequency below a lower threshold is given a reduced frequency weight.

In an embodiment, the selecting step is performed without reference to any particular subject matter or context of the data to be converted or the subject matter or context of the plurality of schema. That is, the selecting may be "contextually blind" such that the selecting may be applied even to contextually indeterminate data. Thus, contextually indeterminate data may be converted with respect to the context in which it is provided even without identifying precisely the context to which the source data relates.

In an embodiment, the step of accessing may include identifying a public schema, including conversion rules generally applicable to said subject matter area independent of any entity or group of entities associated with said set of data, which establishes a structure for understanding at least a portion of the subject matter area. The public schema may involve an accepted public definition of a semantic object. Alternatively, the step of accessing comprises identifying a private schema, including conversion rules specific to an entity or group of entities less than the public as a whole, which establishes a structure for understanding at least a portion of the subject matter area.

In an embodiment, the step of using may include executing logic to interpret the data to be converted in view of the included conversion rule as to identify an object, an attribute or an attribute value of at least a portion of the data to be converted. The step of using may include performing a comparison of the object, the attribute or the attribute value to a corresponding set of objects, attributes, or attribute values defined by said first schema. The comparison may include utilizing a similarity metric corresponding to the object, the attribute, or the attribute value with respect to a corresponding set of objects, attributes, or attribute values defined by the first schema.

A third aspect includes a system for use in converting contextually indeterminate data from a first form to a second form. The system includes a feature module, executable by a computer-based string analysis tool, which is operable to represent each of a plurality of schema as a plurality of schema features. The system may also include an indexing module, executable by a computer-based string analysis tool, operable to compile an index comprising a mapping, wherein the mapping correlates each schema feature to each one of the plurality of schema containing the schema feature. The system may further include a similarity metric module, executable by a computer-based string analysis tool, that is operable to calculate a similarity metric between a set of data to be converted from the first form to the second form, wherein the set of data is contextually indeterminate and each of a selected portion of the plurality of schema has at least one common feature to the source string, and wherein the similarity metric comprises a quantitative value regarding the commonality of features between the set of data and each of the selected portion of the plurality of schema. The system also includes an optimization module, executable by a computer-based string analysis tool, that is operable to determine the selected portion of the plurality of schema for which a similarity metric is calculated based at least partially on elimination of features from consideration based on a minimum similarity metric threshold and a conversion module operable to select, based on the similarity metric between the set of data and each of the selected portion of the plurality of schema to identify at least one selected schema. As such, the conversion module is operable to apply a contextually dependent conversion rule of the selected schema to the set of data to covert the set of data from the first form to the second form.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For instance, the conversion module operates independently of the context of the set of data to be converted. Furthermore, the system may be operable to perform any or all of the features described above with respect to the first and second aspects.

BRIEF DESCRIPTION OF THE DRAWINGS

FIG. 18 depicts an embodiment of a string cluster that may be derived from a string analysis tool.

FIG. 19 depicts a portion of a taxonomy that may be derived by an unsupervised learning environment based on the string cluster of FIG. 17.

DETAILED DESCRIPTION

Figure 1:
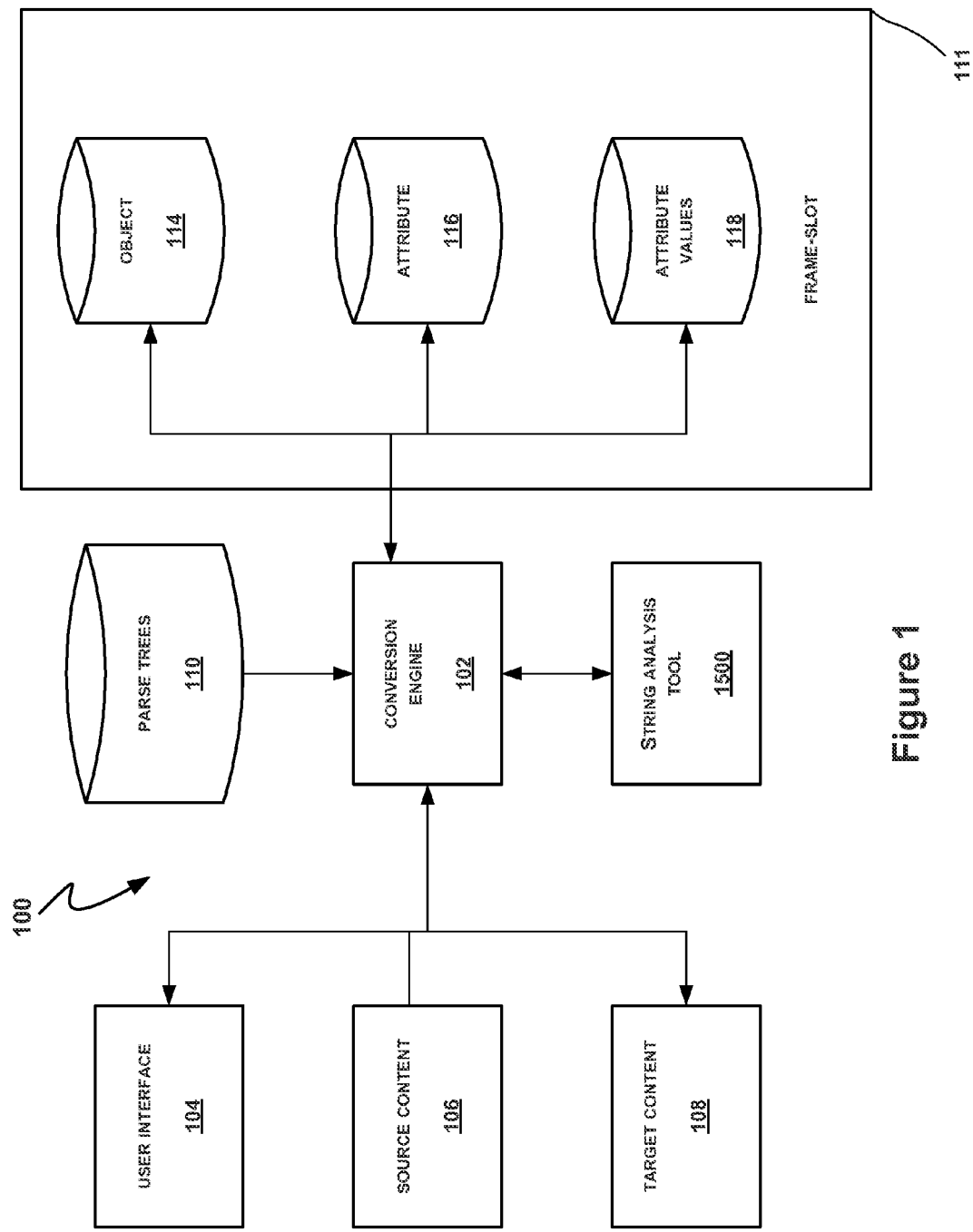
FIG. 1 is a schematic diagram of a semantic conversion system in accordance with the present invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

The present invention relates to converting data from a first or source form to a second or target form. As noted above, such conversions may be desired in a variety of applications relating to, for example, importing data into or otherwise populating an information system, processing a search query, exchanging information between information systems, and translation. Furthermore, such conversions may at least partially depend upon a context of the data in the source form. For example, depending upon a context in which it is used, "BLK" may be converted in one context to "blank", "black", or some other variation depending upon the context in which "BLK" may be used in the source form. As described above, such contextually dependent conversion of data that he particularly difficult in the context unsupervised machine learning.

For example, such contextually dependent data may also be contextually indeterminate. That is, at least a portion of the data in the source form may not be discernible to determine the context in which the data in the source form appears. For instance, continuing the example above, "BLK TAPE" may in a first context correspond to a conversion "BLANK TAPE" or in a second context correspond to a conversion "BLACK TAPE." Furthermore, there may be no discernible context for determining which context is appropriate for the specific source data. Absent this contextual information, the conversion of the data may be difficult for impossible to perform as the context may not be readily resolvable. In this regard, incorrect conversions based on improperly identified contexts may occur.

However, the present disclosure describes systems and embodiments related to a computer-based conversion tool that may provide "contextually blind" conversion of contextually dependent information. For example, source data may be matched to a contextually dependent schema based on similarities of source data and the schema when compared as strings in an indexed string matching process. In this regard, even if the context of the source data may not be resolved in isolation, similarity matching to a schema that is context dependent may allow for proper contextually based conversion of the source data even without specifically identifying a context of the source data. That is, the contextually dependent schemas may be matched to the source data based on the similarity thereto rather than by matching identified contexts of the source data in the schema.

Accordingly, the following description generally describes applications of schemas to convert data. Thereafter, specific examples of the use of indexed string matching are disclosed. Finally, specific embodiments for contextually blind conversion of source data matched to schemas are described. It may be appreciated that specific examples are discussed herein such as, for example, with particular reference to conversion of product oriented data (e.g., legacy product information from businesses). However, it will be appreciated that the description provided herein is generally applicable to convert data from a first form to a second form without reference to context. As such, the embodiments described herein may be utilized in a variety of applications and fields without limitation. For instance, the following disclosure may be applied in a variety of fields such as, for example, analysis and management of business data, medical record data, scientific research data, etc.

Use of Schemas in Data Conversion

Use of schema in the conversion of source data to a target form one generally described in U.S. Pat. No. 8,199,985, the entirety of which is incorporated by reference herein. For example, in the following description, examples relating to processing a source stream including a product oriented attribute phrase are described. Such streams may include information identifying a product or product type together with a specification of one or more attributes and associated attribute values. For example, the source stream (e.g., a search query or product descriptor from a legacy information system) may include the content "8 oz. ceramic coffee cup." In this case, the product may be defined by the phrase "coffee cup" and the implicit attributes of size and material have attribute values of "8 oz." and "ceramic" respectively.

While such source streams including product oriented attribute phrases provide a useful mechanism for illustrating various aspects described herein, and in fact represent significant commercial implementations, it should be appreciated that the description is not limited to such environments. Indeed, it is believed that the description found herein is applicable to virtually any other conversion environment with concepts such as product attributes and attribute values replaced, as necessary, by logical constructs appropriate to the subject environment, e.g., part of speech and form. Moreover, as noted above, the conversion rules are not limited to elements of a single attribute phrase or analog, but may involve relationships between objects, including objects set forth in separate phrases. Accordingly, the specific examples below should be understood as exemplifying and not limiting.

At least some conversions may be executed with the assistance of a frame-slot architecture. Such a frame-slot architecture may function independently to define a full conversion model for a given conversion application (e.g., depending on a context of the conversion model), or may function in conjunction with one or more parse tree structures to define a conversion model. In the latter regard, the frame-slot architecture and parse tree structures may overlap with respect to subject matter.

The above-noted coffee cup example is illustrative in this regard. It may be desired to correlate the source string "8 oz. ceramic coffee cup" to a product database, electronic catalogue, web-based product information or other product listing. Such a product listing may include a variety of product types, each of which may have associated attributes and grammar rules. In this regard, the product types and attributes may be organized by one or more parse-tree structures. These parse tree structures, which are described and shown in U.S. Pat. No. 8,396,859, generally organize a given subject matter into a hierarchy of classes, subclasses, etc., down to the desired level of granularity, and are useful for improving conversion accuracy and improving efficiency in building a grammar among other things. In this case, "coffee cup" may fall under a parse tree node "cups" which, in turn falls under a parent node "containers" which falls under "housewares", etc. Similarly, the same or another parse tree may group the term "oz.", or a standardized expression thereof (e.g., defined by a grammar) such as "ounce" under the node "fluid measurements" (ounce may also appear under a heading such as "weights" with appropriate grammar rules for disambiguation) which, in turn, may fall under the parent node "measurements", etc.

As noted above, such a parse tree structure has certain efficiencies in connection with conversion processes. However, in some cases, very deep parses may be required, e.g., in connection with processing terms associated with large data systems. Moreover, such terms are often processed as individual fields of data rather than closer to the whole record level, thereby potentially losing contextual cues (if present) that may enhance conversion accuracy and missing opportunities to quickly identify content anomalies or implement private schema to define legal attributes or values for a given information object. Finally, such parse tree processes may impose a rigid structure that limits applicability to a specific subject matter context, thereby limiting reuse of grammar segments.

By contrast, a frame-slot architecture allows for consideration of source stream information at, or closer to, the whole record level. This enables substantial unification of ontology and syntax, e.g., collective consideration of attribute phrases, recognized by the grammar and attribute values contained therein. Moreover, this architecture allows for consideration of conversion rules based on specific source data contexts (e.g., by application of a context specific schema that may be identified from a plurality of such schema). In the coffee cup example, the frame-slot architecture allows for consideration of the source stream "8 oz. coffee cup" in its entirety. In this regard, this stream may be recognized as an attribute phrase, having "coffee cup" as an object. Grammar rules specific to this object or a class including this object or rules of a public schema (e.g., that may be selected in a manner described in greater detail below) may allow for recognition that "oz." means "ounce" and "ounce" in this context is a fluid measure, not a weight measure. A user-defined schema, for example, a private schema of the source or target information owner, may limit legal quantity values associated with "ounce" in the context of coffee cups to, for example, "6", "8" and "16". In this case, recognition of "8" by the schema provides increased confidence concerning the conversion. If the value had been "12", which would not comply with the schema in this example, this might serve, for example to quickly identify an anomaly (e.g., in the case of mapping records from a legacy data system to a target system) or identify an imperfect match (e.g., in the case of a search query) so that appropriate action may be taken.

The frame-slot architecture thus encompasses a utility for recognizing stream segments, obtaining contextual cues from within or external to the stream (if present), accessing grammar rules specific to the subject matter of the stream segment and converting the stream segment. This may avoid deep parses and allow for greater conversion confidence and accuracy. Moreover, greater grammar flexibility is enabled, thus allowing for a higher degree of potential reuse in other conversion contexts. In addition, executing such processes by reference to a schema enables improved context-related analysis. In short, conversions benefit from surrounding and external context cues in a manner analogous to human processing. However, it may be appreciated that the number of schema available may be relatively large and contextually diverse such that identifying an appropriate, contextually relevant schema may be difficult, particularly in the absence of context information regarding the same data.

As noted above, the frame-slot architecture may be developed in a top-down or bottom-up fashion. For example, objects, associated attributes and legal attribute values for a given context of data may be defined as schema that are imposed on the data. In this regard, a schema may be based on a given context. A plurality of schema may thus be developed with respect to different potential contexts. In the coffee cup example, all of the attributes of the schema may be defined based on an analysis of a product inventory or the structure of a legacy information system. Additionally or alternatively, schema may be independently developed (e.g., with respect to a given subject matter or context). In either case, the schema may dictate the legal values for quantity (e.g., to 6, 8 and 16 in the example of the coffee cup). Any information not conforming to the schema may be identified and processed as an anomaly. Conversely, the legal values may be defined based on the data. For example, files from a legacy information system may be used to define the legal attribute values which, then, develop as a function of the input information.

FIG. 1 illustrates a system 100 for implementing such conversion processing. The illustrated system 100 includes a conversion engine 102 that is operative to execute various grammar rules and conversion rules for converting source information to a target form. In the illustrated embodiment, the system 100 is operative to execute both frame-slot architecture methodology and parse tree structure methodology. However, it will be appreciated that a frame-slot architecture may be executed in the absence of a cooperating parse tree environment.

The illustrated conversion engine 102 receives inputs and/or provides outputs via a workstation associated with the user interface 104. For example, in a set-up mode, a user may select terms for processing and create associated relationships and grammar rules via the user interface 104. In the context of a search system, a search query may be entered, and search results may be received, via the user interface 104. In this regard, the conversion engine 102 may be resident at the work station associated with the user interface 104, or may communicate with such a work station via a local or wide area network.

The source content 106 includes the source string to be converted. Depending on the specific application, this content 106 may come from any of a variety of sources. Thus, in the case of an application involving transferring information from one or more legacy information systems into a target information system, the source content 106 may be accessed from the legacy systems. In the case of a search engine application, the source content may be derived from a query. In other cases, the source content 106 may be obtained from a text to be translated or otherwise converted. The source content 106 may be preprocessed to facilitate conversion or may be in raw form. In the case of preprocessing, the raw content may be supplemented, for example, with markers to indicate phrase boundaries, the content 106 may be clustered via an indexed string matching technique as will be described in greater detail below, or other in other manners. Such preprocessing may be provided in a set-up mode process. In addition, some such information may be present in a legacy system and may be used by the conversion engine 102. It will be appreciated that the sources of the content 106 and the nature thereof is substantially unlimited.

The illustrated conversion engine 102 performs a number of functions. In this regard, the engine 102 is operative to process the source content 106 to parse the content into potential objects and attributes and identify the associated attribute values. The engine 102 then operates to convert the relevant portion of the source content 106 using a parse tree structure 110 and/or a frame-slot architecture 111, and provides a converted output, e.g., to a user or target system.

With regard to the parse tree structure 100, such a structure may be developed using the conversion engine 102 in a set-up mode or may be generated from the source data 106 or other source as will be discussed in greater detail below. In an embodiment, the nodes of the parse tree structure 110 may be defined by someone familiar with the subject matter under consideration or based on an analysis of a data set. Moreover, certain structure developed in connection with prior conversion applications may be imported to facilitate the set-up process. Such a set-up process is described in U.S. Pat. No. 8,396,859, which is incorporated herein by reference. At a high level, this set-up involves defining the hierarchical structure of the tree, populating the various nodes of the tree, developing standardized terminology and syntax and associated grammar and conversion rules associated with the tree and mapping source content variants to the standardized terminology and syntax.

Figure 15:
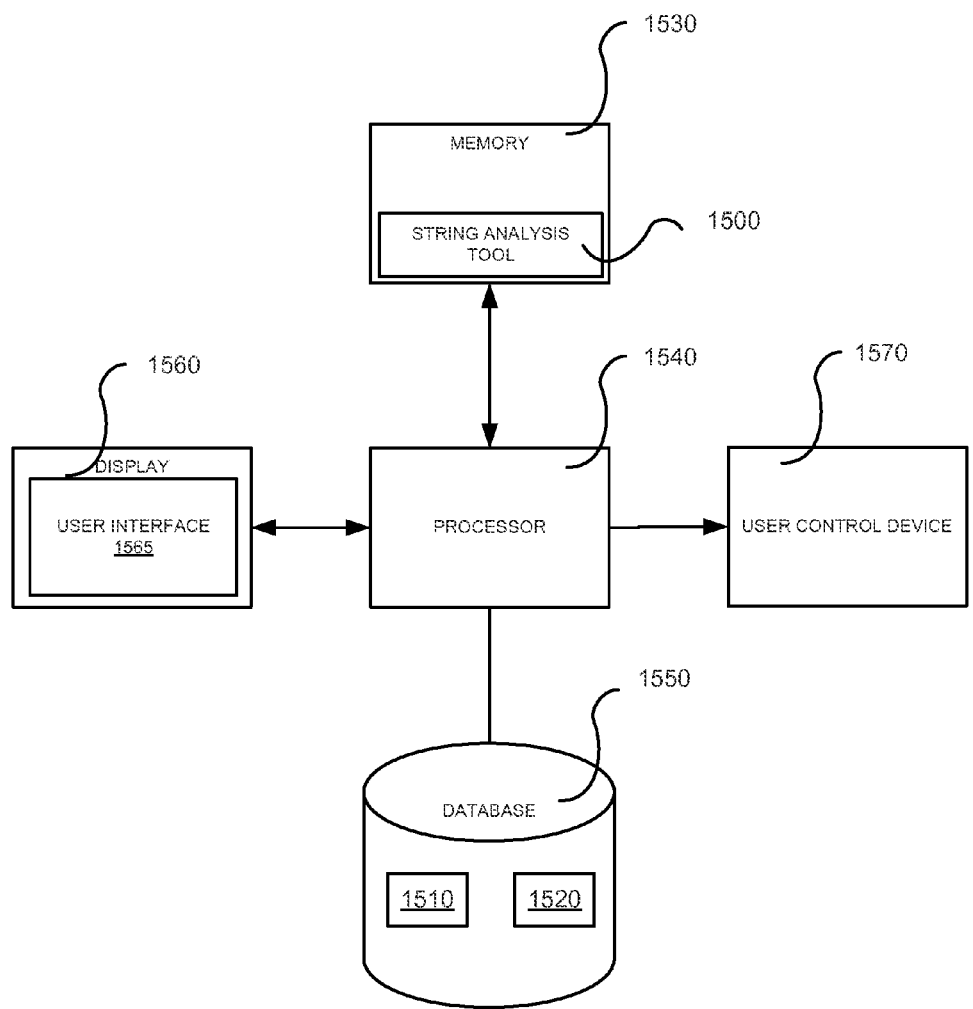
FIG. 15 depicts a schematic view of an embodiment of hardware associated with an embodiment of a string analysis tool.

In the case of the frame-slot architecture 111, the conversion engine 102 obtains the source content 106 and identifies potential objects, attributes and attribute values therein. In this regard, the source content 106 may be parsed as discussed above. In addition, the engine 102 may be in operative communication with a string analysis tool 1500 (e.g., as shown in FIG. 15 and described in greater detail below). The string analysis tool 1500 may be operable to match the source content 106 to a schema specific to the frame-slot conversion. For example, information indicating that, when used in connection with "coffee cup" the term "ounce" is a fluid (not a weight) measure, may be defined by a private schema developed for the subject conversion application or derived from an analysis of external information sources that is matched to the source content 106 by the string analysis tool 1500.

In the context of the frame-slot architecture, the conversion engine is operative to: identify potential objects, attributes and attribute values; process such information in relation to certain stored information concerning the objects, attributes and attribute values; access associated grammar and conversion rules; and convert the information from the source form to a target form. In this regard, the illustrated system 100 includes stored object information 114, stored attribute information 116 and stored attribute value information 118. This information may be defined by a public or private schema or by reference to external information regarding the subject matter under consideration (e.g., which may be matched to the source content 106 by the string analysis tool 1500).

For example, the object information 114 may include a list of recognized objects for which the frame-slot architecture is applicable together with information associating the object with legal attributes and/or attribute values and other conversion rules associated with that object. The attribute information 116 may include a definition of legal attributes for the object together with information regarding associated attribute values and associated grammar and conversion rules. Finally, the attribute value information 118 may include a definition of legal attribute values for given attributes together with associated information concerning grammar and conversion rules.

Figure 2:
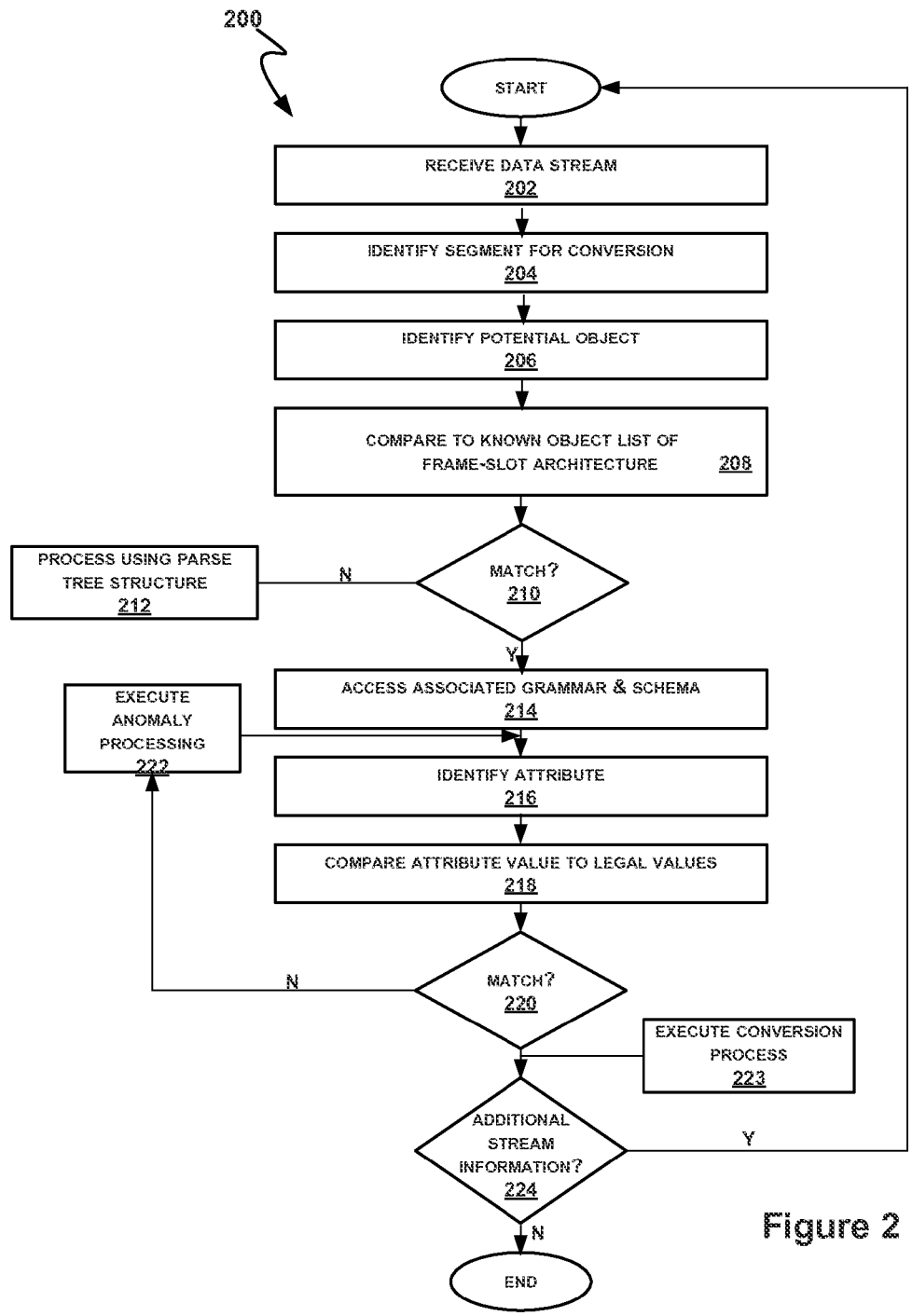
FIG. 2 is a flow chart illustrating a semantic conversion process in accordance with the present invention.

FIG. 2 shows a flow chart illustrating a process 200 that may be implemented by a conversion system such as described above. It will be appreciated that the various process steps illustrated in FIG. 2 may be combined or modified as to sequence or otherwise. Moreover, the illustrated process 200 relates to a system that executes a parse tree structure as well as a frame-slot architecture. It will be appreciated that a frame-slot architecture in accordance with the present invention may be implemented independent of any associated parse tree structure.

The illustrated process 200 is initiated by receiving (202) a data stream from a data source. Such a data stream may be entered by a user or accessed from a legacy or other information system. A segment of the data stream is then identified (204) for conversion. For example, the segment may comprise an attribute phrase or any other chunk of source data that may be usefully processed in a collective form. Such a segment may be identified as the entirety of an input such as a search query, the entirety or a portion of a file from a legacy or other information system, or based on a prior processing step whereby phrase boundaries have been marked for purposes of conversion processing or based on logic for recognizing attribute phrases or other chunks to be coprocessed. For example, the segment may be determined based on a clustering process performed on the source content 106.

In the illustrated process 200 the identified segment is then processed to identify (206) a potential object within the segment. In the case of the coffee cup example above, the object may be identified as the term "cup" or "coffee cup." The potential object may be identified by comparison of individual terms to a collection of recognized objects or based on a preprocessing step wherein metadata has been associated with the source content to identify components thereof including objects. The potential object is then compared (208) to a known object list of a frame-slot architecture. As discussed above, within a given subject matter, there may be a defined subset for which frame-slot processing is possible. In the illustrated process 200, if a match (210) is identified, the system then accesses (214) an associated grammar and schema for processing in accordance with the frame-slot architecture. Otherwise, the segment is processed (212) using a parse tree structure. As a further alternative, if no object is recognized, an error message may be generated or the segment may be highlighted for set-up processing for out of vocabulary terms, e.g., so as to expand the vocabulary and associated grammar rules. The specific schema (e.g., including a context specific frame-slot architecture and/or parse tree structure) may be context specific and selected in regard to the source content 106.

In the case of processing using the frame-slot architecture, an attribute associated with the object is then identified (216). In the coffee cup example, the terms "ceramic" or "8 oz." may be identified as reflecting attributes. Such identification may be accomplished based on grammar rules or based on metadata associated with such terms by which such terms are associated with particular attribute fields. The associated attribute values are then compared (218) to legal values. For example, the value of "8 oz." may be compared to a listing of legal values for the attribute "fluid measurement" in the context of "coffee cup." These legal values may be defined by a private schema, for example, limited to the inventory of an entity's product catalog or may be based on other external information (e.g., defining a legal word form based on part of speech). If a match is found (220) then the attribute phrase is recognized and an appropriate conversion process if executed (223) in accordance with the associated grammar and conversion rules. The process 200 then determines whether additional stream information (224) is available for processing and either processes such additional information or terminates execution.

In the case where the attribute value does not match a legal value, anomaly processing is executed (222). How anomalies are processed generally depends on the application and context. For example, if an anomaly is identified during a set-up process, the anomalous attribute value may be verified and added to the legal values listing. For example, in the coffee cup example, if the attribute value is "12 oz." and that value does not match a previously defined legal value but, in fact, represents a valid inventory entry, the term "12 oz." (or a standardized version thereof) may be added to the legal values list for the attribute "fluid measurement" in the context of "coffee cup."

Alternatively, further processing may indicate that the attribute value is incorrect. For example, if the attribute value was "6 pack," an error in parsing may be indicated. In this case, an appropriate error message may be generated or the segment may be reprocessed to associate an alternate attribute type, e.g., "object quantity," with the term under consideration.

In other contexts, different anomaly processing may be executed. For example, in the case of processing a search query, illegal values may be ignored or closest match algorithms may be executed. Furthermore, additional schema matching may be performed to determine if the attribute value is associated with a different context provided in another schema. Thus, in the case of a query directed to a "12 oz. coffee cup," search results may be generated or a link may be executed relative to inventory related to coffee cups in general or to 8 and 16 oz. coffee cups. It will be appreciated that many other types of anomaly processing are possible in accordance with the present invention.

Figure 4:
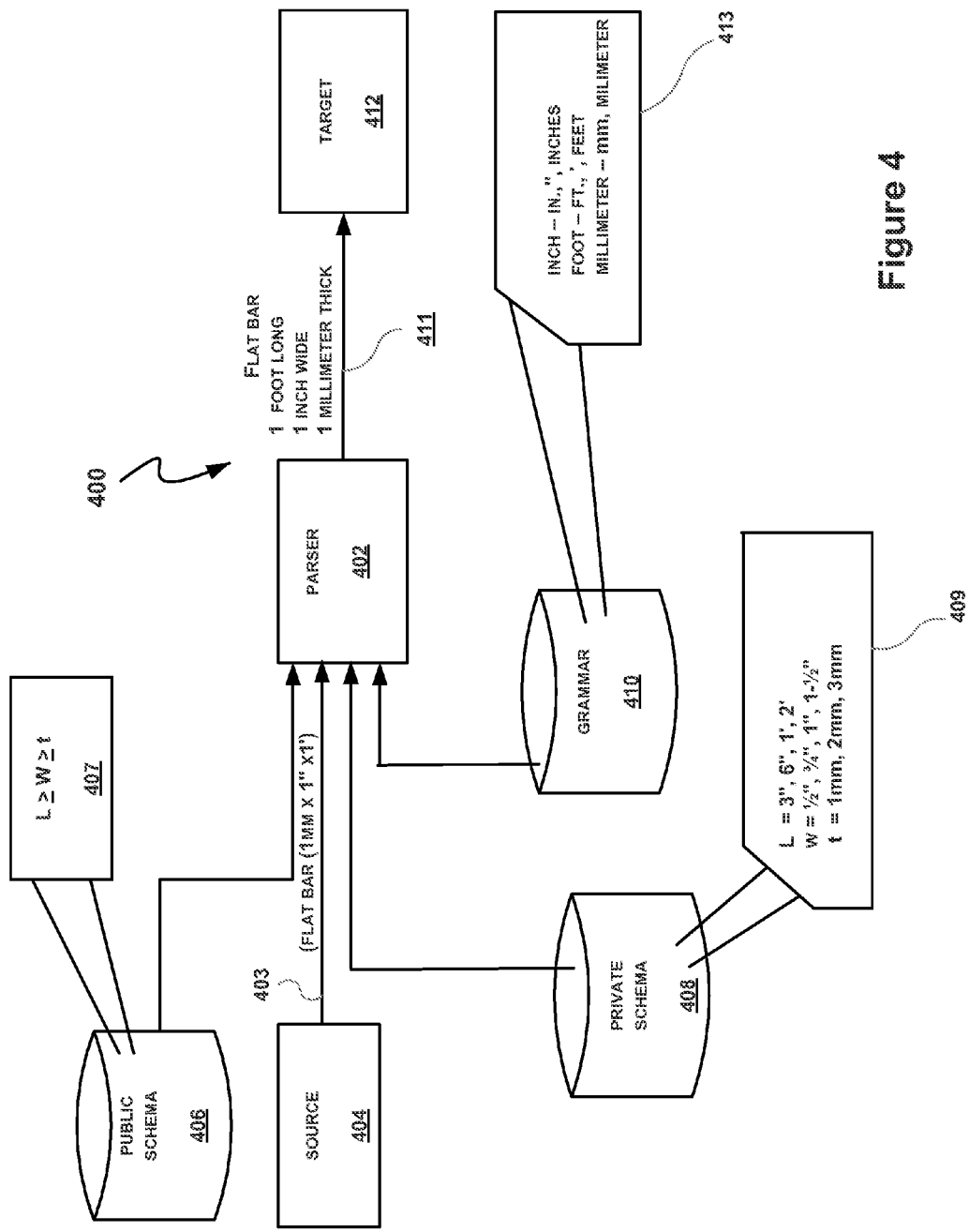
FIG. 4 is a schematic diagram illustrating the use of public and private schema in a conversion process in accordance with the present invention.
Figure 5:
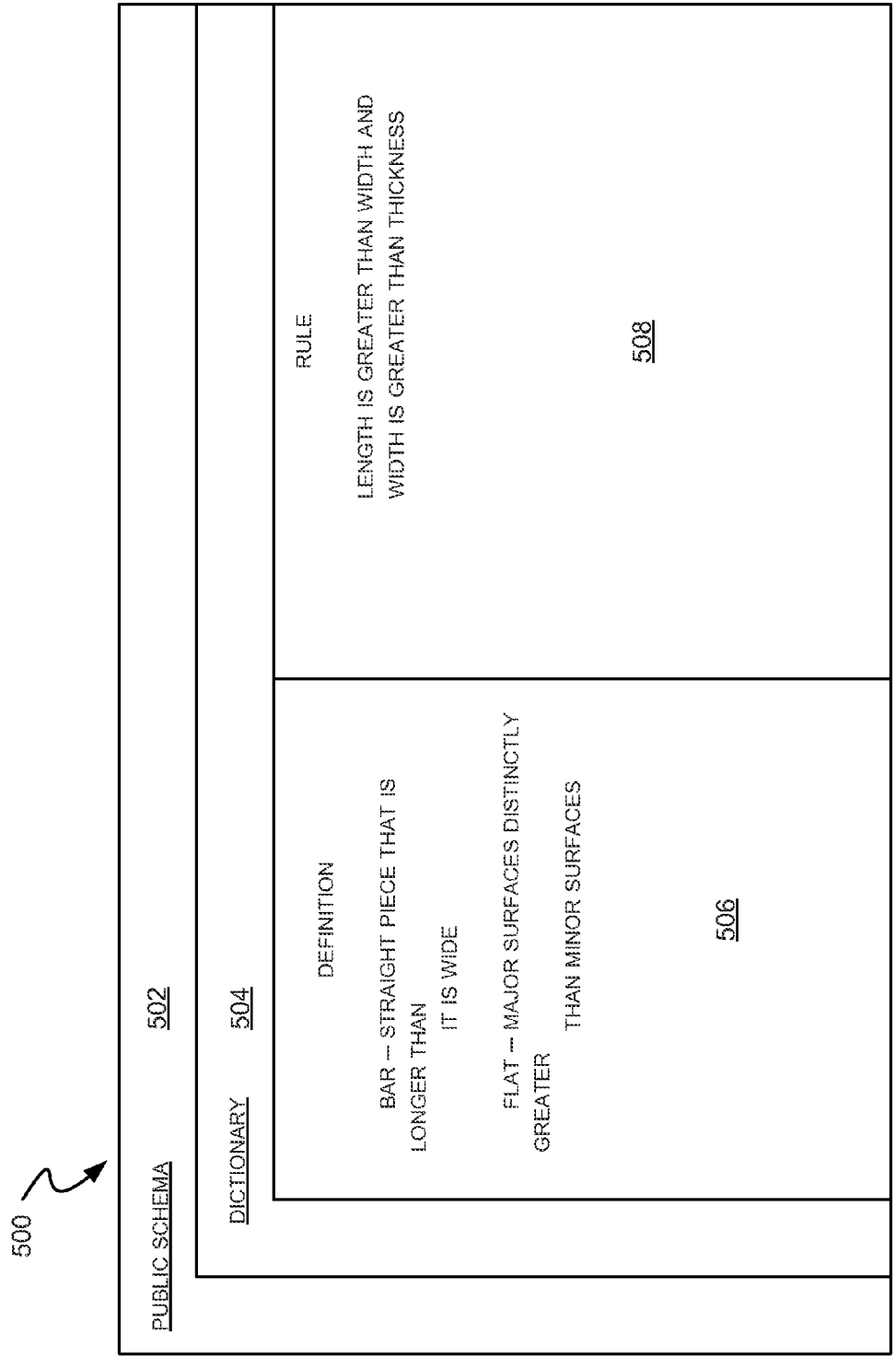
FIGS. 5-6B illustrate exemplary user interfaces in accordance with the present invention.

In the above examples, the conversion system can implement both a frame-slot architecture and a parse tree structure. This architecture and structure will now be described in more detail. Referring first to FIG. 4, a schematic diagram of a conversion system 400 in accordance with the present invention is shown. The illustrated conversion system 400 includes a parser 402 for use in parsing and converting an input stream 403 from a source 404 to provide an output stream 411 in a form for use by a target system 412. In this case, the source stream 403 includes the content "flat bar (1 mm×1"×1')." To accomplish the desired conversion, the parser 402 uses information from a public schema 406, a private schema 408 and a grammar 410. In this regard, it may be appreciated the public schema 406, the private scheme 408, and the grammar 410 may be selected from a plurality of external sources based on similarities to the source content 404. The public schema 406 may include any of various types of information that is generally applicable to the subject matter and is not specific to any entity or group of entities. In this regard, FIG. 5 illustrates an example structure 500 showing how public information related to the subject matter area may be used to define a conversion rule. As shown, a new structure 500 includes a dictionary 504 that forms a portion of the public schema 502. Panel 506 shows definitions related to the object "flat bar." Specifically, "bar" is defined as "straight piece that is longer than it is wide" and "flat" is defined as including "major surfaces distinctly greater than minor surfaces." Such definitions may be obtained from, for example, a general purpose dictionary, a dictionary specific to the subject matter, a subject matter expert or any other suitable source and may be matched to the content 404 as will be described in greater detail below. These definitions are translated to define a rule as shown in panel 508. Specifically, the associated rule indicates that "length is greater than width and width is greater than thickness." This rule may then be written into the logic of a machine-based conversion tool. Referring again to FIG. 4, this rule is reflected in file 407 of public schema 406. Accordingly, the schema may include context specific conversion rules (e.g., in this case relating to this specific definition of "flat bar").

Figure 6A:
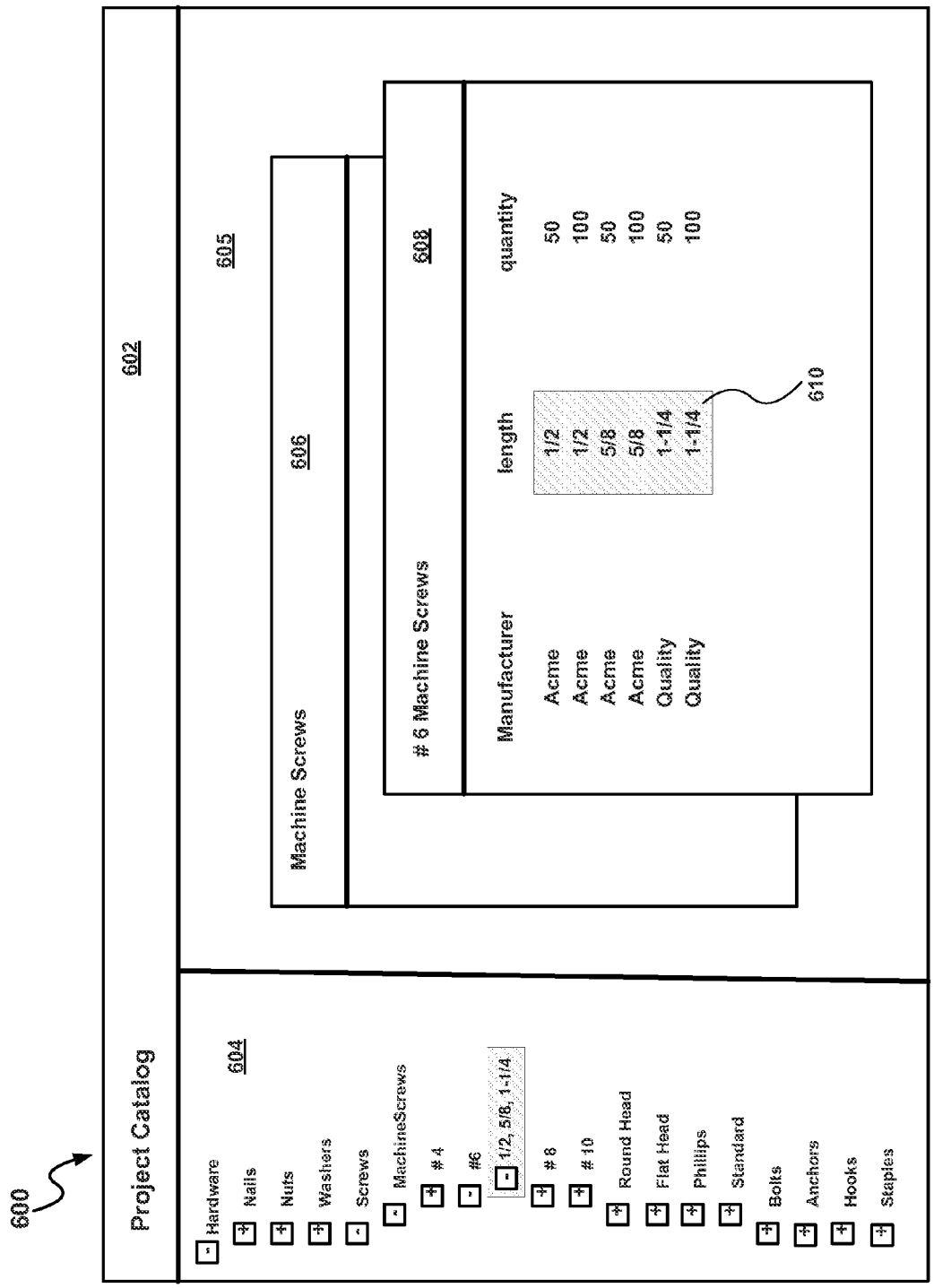

The parser 402 also receives input information from private schema 408 in the illustrated example. The private schema 408 may include conversion rules that are specific to an entity or group of entities less than the public as a whole. For example, the private schema 408 may define legal values for a given attribute based on a catalog or inventory of an interested entity such as an entity associated with the target system 412. An associated user interface 600 is shown in FIG. 6A. For example, the user interface 600 may be used in a start-up mode to populate the legal values for a given attribute. In this case, the user interface is associated with a particular project 602 such as assembling an electronic catalog. The illustrated user interface 600 includes a data structure panel 604, in this case reflecting a parse-tree structure and a frame-slot structure. The interface 600 further includes a private schema panel 605. In this case, the private schema panel 605 includes a number of windows 606 and 608 that define a product inventory of a target company. In this case, a length field 610 associated with a table for #6 machine screws is used to define legal attribute value 612 at a node of panel 604 corresponding to attribute values for #6 machine screws. Associated legal value information is shown as a file 409 of the private schema 408 in FIG. 4. As may be appreciated a plurality of private schema 408 may be developed that each may correspond to a particular context of data to be converted.

Figure 6B:
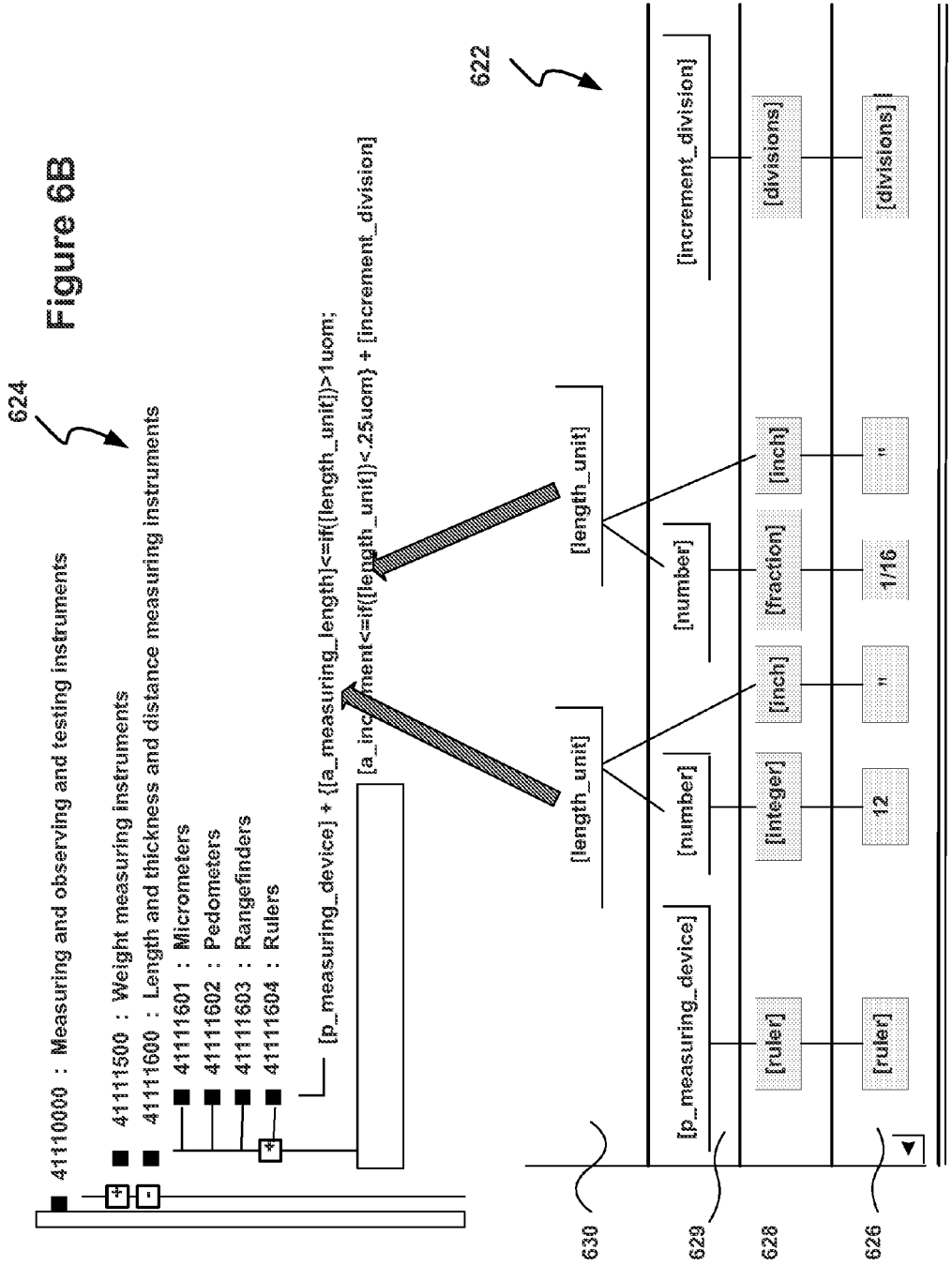

A further example of user interface segments 620 is shown in FIG. 6B. Specifically, FIG. 6B shows a parse tree graphics panel 622 and a parse tree node map panel 624. For purposes of illustration, these panes 622 and 624 are shown in a stacked arrangement. However, it should be appreciated that the panels 622 and 624 may be otherwise arranged on a user interface screen or provided on separate screens. Panel 622 shows a parse tree for a particular product descriptor. In this case, the product descriptor is shown at the base level 626 of the parse tree as "ruler 12" 1/16" divisions." Layers 628-630 show patent nodes of the parse tree. Of particular interest, both of the chunks "12"" and "1/16"" are associated with the high level node "[length_unit]" reflecting the recognition by a parse tool that each of these chunks indicates a measure of length.

If the parse tree structure went no deeper, and there was not frame-slot logic available, these two length measures would present an ambiguity. However, human reader would readily recognize that, in the context of rulers, "12"" likely represents the overall length of the ruler and "1/16"" most likely represents measurement increments. In the case of a frame-slot architecture, such logic can be captured by a rule that enables the parse tool to recognize and apply such context cues to provide accurate interpretations without deep parses.

In this case, such a rule is reflected within the parse tree node map of panel 624. Specifically, a rule for interpreting "length unit" designations in the context of rulers (and, perhaps, other length measuring devices) is encoded under the "ruler" node. As shown, the rule interprets a given "length unit" as indicating "a measuring length" if the associated attribute value is greater than 1 unit of measure (uom) and treats the "length unit" as indicating an "increment" if the associated attribute value is less than 0.25 uom. This provides a certain and structurally efficient mechanism for disambiguating and converting length units in this context. Moreover, it is anticipated that such rules will be reusable in other contexts within a project (e.g., for tape measures or straight edges) and in other projects.

Grammar 410 may also provide information to the parser 402. The grammar may provide any of various information defining a lexicon, syntax and an ontology for the conversion process. In this regard, the grammar may involve definition of standardized terminology described in U.S. Pat. No. 8,396, 859. Thus, in the illustrated example, file 413 associates the standardized terms "inch," "foot," and "millimeter" with various alternate forms thereof. As with the public and/or private schema, grammar 410 may represent external information that may be matched to the source data 106 via an indexed string matching process.

The parser 402 can then use the input from the public schema 406, private schema 408 and grammar 410 to interpret the input stream 403 to provide an output stream 411 to the target 412. In this case, the noted input stream 403 is interpreted as "flat bar-1' long, 1" wide and 1 mm thick.

Figure 3:
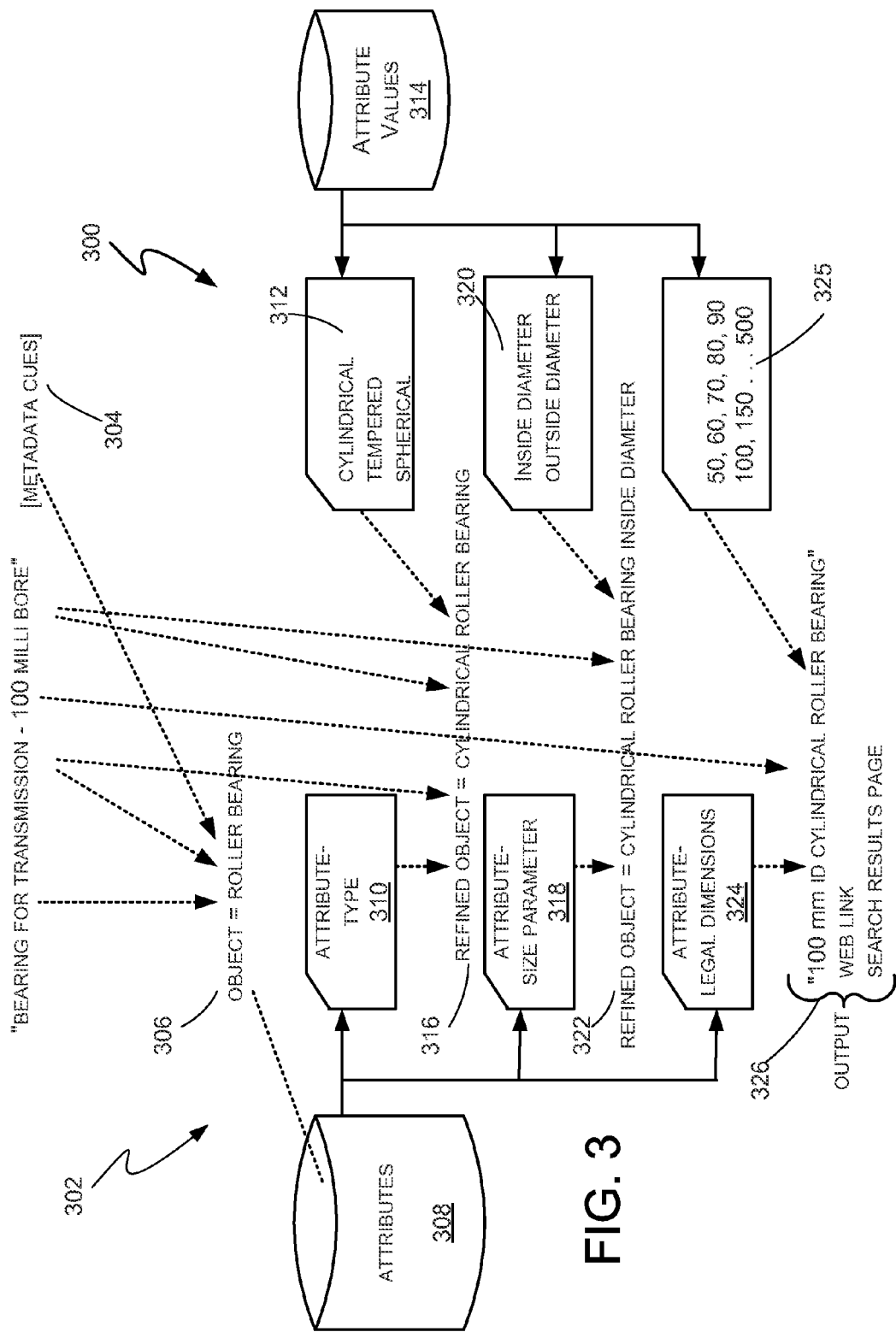
FIG. 3 is a schematic diagram showing an example of a conversion that may be implemented using the system of FIG. 1.

Referring to FIG. 3, a further example related to a frame-slot architecture 300 is illustrated. The architecture 300 is used to process a source stream 302, in this case, "bearings for transmission-100 milli. bore." For example, this source stream may be a record from a legacy information system or a search query. As discussed above, the processing of this source stream 302 may utilize context specific schema or other external information that includes contest specific conversion rules. These rules may be matched to the source stream 302 by an indexed string matching process described below.

The frame-slot architecture 300 may be utilized to identify an object 306 from the source stream 302. As noted above, this may involve identifying a term within the stream 302 and comparing the term to a list of recognized objects or otherwise using logic to associate an input term with a recognized object. Thus, in the illustrated example, the identified object "roller bearing" does not literally correspond to any particular segment of the stream 302. Rather, the object "roller bearing" is recognized from the term "bearing" from the stream 302 (e.g., together with an applicable schema provided by the similarity between the term "transmission" included within the content of the stream 302 and, perhaps, from external information matched to the same stream 302). Other sources including external sources of information regarding bearings may be utilized in this regard by logic (e.g., indexed string matching) for matching the stream 302 to the object 306.

Based on the object 306, information regarding attributes 308 and attribute values 314 may be accessed. As discussed above, such information may be derived from public and/or private schema. For example, an attribute type 310 may be identified for the object 306 and corresponding legal attribute values 312 may be determined. In this case, one attribute associated with the object "roller bearing" is "type" that has legal values of "cylindrical, tapered and spherical." The stream 302 may be processed using this information to determine a refined object 316. In this case, the refined object is determined to be "cylindrical roller bearing." Again, it will be noted that this refined object 316 is not literally derived from the stream 302 but rather, in the illustrated example, is determined based on certain contextual information derived from matched external sources and certain conversion processes. Thus, the stream 302 is determined to match the attribute value "cylindrical" based on contextual information related to the terms "transmission" and "bore" included within the content of the source stream 302 as matched to external schema that identify "cylindrical roller bearing" based on similarities between the source stream 302 and external information regarding types of roller bearings. Information regarding the attributes 308 and attribute values 314 may again be accessed based on this refined object 316 to obtain further attributes 318 and associated attribute values 320. It should be noted that these attributes and attribute values 318 and 320, though illustrated as being dependent on the attribute 310 and attribute value 312 may alternatively be independent attributes and attribute values associated with the object 306. However, in the illustrated example, the attribute "size parameter" is associated with the legal values "inside diameter" and "outside diameter" based on the refined object "cylindrical roller bearings."

In this case, the attribute 318 and attribute value 320 are used together with certain external information to define a further refined object 322. In this case, the further refined object 322 is defined as "cylindrical roller bearing inside diameter." A selection between the legal value "inside diameter" and "outside diameter" is made based on a match the term "bore" included within the content of the stream 302 and similar external information including attributes of a bore. Based on this further refined object 322, information regarding the attributes 308 and attribute values 314 can be used to identify a further attribute 324 and associated legal values 325. In this case, the attribute 324 is "legal dimensions" and associated legal values 325 are defined as "50, 60, 70, 80, 90, 100, 150 . . . 500." These values are assumed for the purposes of this example to be given in millimeters. In this case, the input stream 302 is processed in view of the attribute 324 and legal values 325 to define an output 326 identified as "100 mm ID cylindrical roller bearings." In this regard, the stream term "100 milli." is found to match the legal value of "100" for the attribute "legal dimensions" in the context of cylindrical roller bearings inside diameter. It will be appreciated that the term "milli." has thus been matched, based on a standardization or conversion process, to the designation "mm." It should be noted in this regard that success in matching the source term "100 milli." to the legal value "100 mm" provides further confidence was correctly and accurately performed.

Various types of outputs reflecting various conversion applications may be provided in this regard. Thus, in the case of converting an input file from a legacy database to an output form of a target information system, the input stream 302 may be rewritten as "100 mm ID cylindrical roller bearing." In the case where the source stream 302 represents a search query, the output may be provided by way of linking the user to an appropriate web page or including associated information in a search results page. It will be appreciated that other types of output may be provided in other conversion environments.

As noted above, the conversion engine 102 may also implement a parse tree structure for conversion processes. Such conversion processes may relate, for example, to search systems or other information transformation systems as will be described below. Generally, such a search system may be operable in two modes: the set-up mode and the use mode. In the set-up mode, the conversion engine 102 accessing lists of potential search terms and/or source terms, developing a standardized set or set of terms, establishing a classification structure, associating the standardized terms with the classification structure and selectively transforming (e.g., translating) the terms as necessary. As may be appreciated these processes may leverage functionality of the string analysis tool 1500 as will be described in greater detail below.

Figure 7:
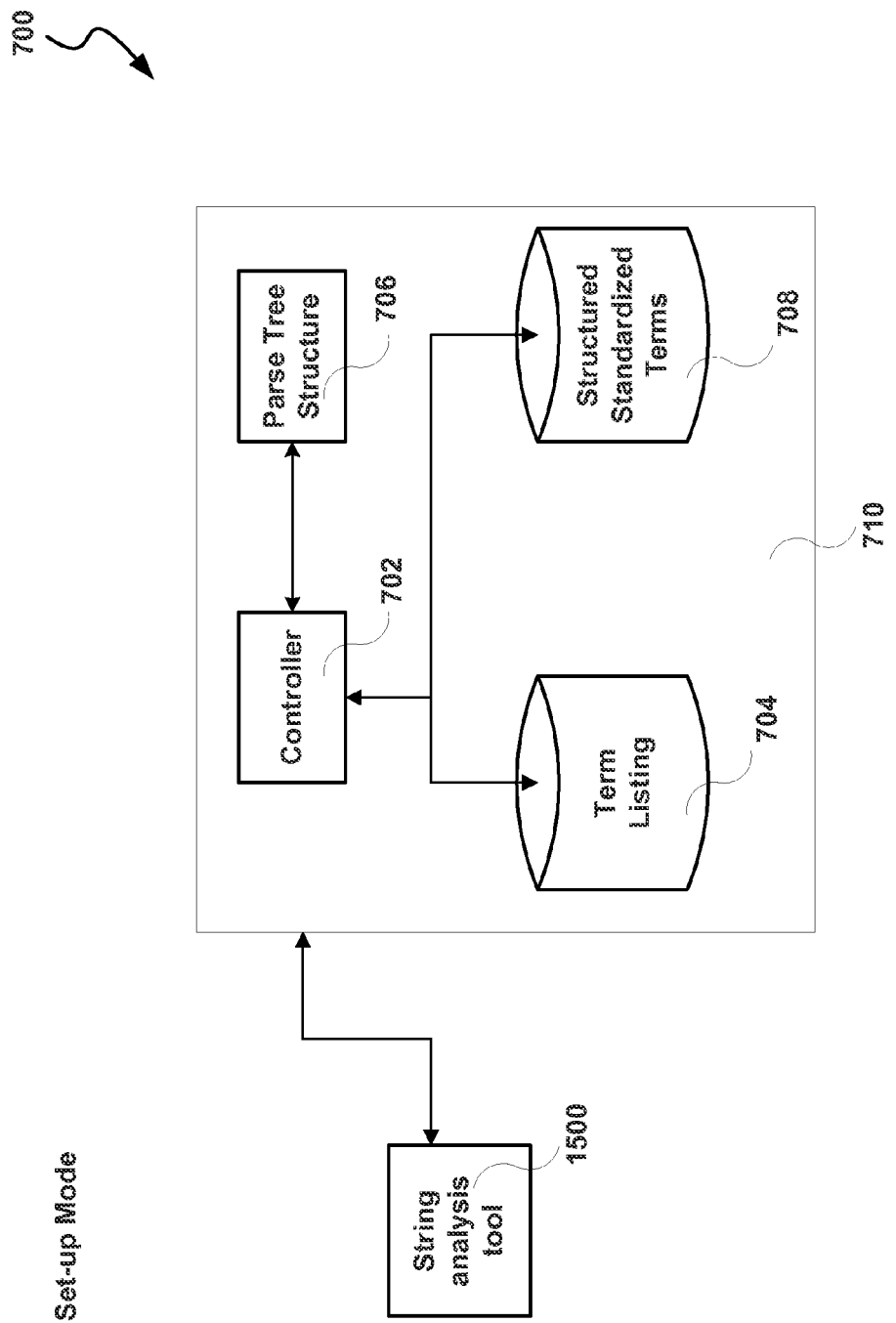
FIG. 7 is a schematic diagram illustrating set-up mode operation of a system in accordance with the present invention.

FIG. 7 is a schematic diagram of a search system 700, in accordance with the present invention, operating in the startup mode. Generally, the system 700 includes a controller 702 and storage configured to store a term listing 704, a parse tree structure 706 and a set of structured standardized terms 708. Although the system 700 is illustrated as being implemented on a single platform 710, it will be appreciated that the functionality of the system 700 may be distributed over multiple platforms, for example, interconnected by a local or wide area network.

In an embodiment, the string analysis tool 1500 may interface with the controller 702 to access a previously developed parse tree structure 706 or to develop the structure 706. In this regard, the parse tree structure 706 generally defines a number of classifications, each generally including one or more sub-classifications that collectively define the subject matter area. Examples will be provided below. The number of layers of classifications and sub-classifications will generally be dependent on the nature of the subject matter. In many cases, many such classifications will be available, for example, corresponding to headings and subheadings of a catalog or other pre-existing subdivisions of a subject matter of interest. In other cases, the subject matter expert may develop the classifications and sub-classifications based on an analysis of the subject matter.

For instance, as may be appreciated below, a clustering process performed on data relating to the subject matter may provide structure relative to the classification string analysis tool 1500 can then use the controller 702 to access a term listing 704 to be processed. As noted above, such a term listing 704 may include potential search terms, source terms from a source data collection or both. In the case of potential search terms, the terms may be obtained from a pre-existing list or may be developed by a use. For example, the potential search terms may be drawn from a stored collection of search terms entered by users in the context of the subject matter of interest. Additional sources may be available, in a variety of contexts, for example, lists that have been developed in connection with administering a pay-per-click search engine. The list may be updated over time based on monitoring search requests. For example, in the context of online shopping applications, the source listing may be drawn from an electronic product catalog or other product database.

After accessing the term listing, the string analysis tool 1500 may assist in performing a number of functions including standardization and classification. Standardization refers to mapping of terms from the term listing 704 to a second set, generally a smaller set, of standardized terms. In this manner, misspellings, abbreviations, colloquial terms, synonyms, different linguistic/syntax conventions of multiple legacy systems and other idiosyncratic matter can be addressed such that the list of standardized terms is substantially reduced in relation to the original term listing 704. It will be appreciated from the discussion below that such standardization facilitates execution of the searching functionality as well as transformation functions as may be desired in some contexts, e.g., translation. The standardization may include identifying similar features between the source the term listing 704 and structured standardized terms 708.

The resulting list of standardized terms 708 can then be mapped to the parse tree structure 706. As will be described below, this can be executed via a simple drag and drop operation on a graphical user interface. Additionally or alternatively, the mapping may be facilitated by way of matching a term to the parse tree structure 706 (e.g., either by way of similarities to the parse tree structure 706 or other values already existing in the parse tree structure 706). Thus, an item from a source listing, for example, identifying a particular Post-it note product, may be associated with an appropriate base level classification, for example, "Adhesive Notepad." Similarly, a term from a potential search term listing such as "Sticky Pad" may be associated with the same base level classification. It will be appreciated that a given term may be associated with more than one base level classification, a given base level classification may be associated with more than one parent classification, etc.

As noted above, such a base level classification may be associated with a parent classification, grandparent classification, etc. All of these relationships are inherited when the term under consideration is associated with a base level classification. The result is that the standardized term is associated with a string of classes and sub-classes of the parse tree structure 706. For example, these relationships may be reflected in an XML tag system or other metadata representation associated with the term. The resulting structured standardized terms are then stored in a storage structure 708 such as a database.

Figure 8:
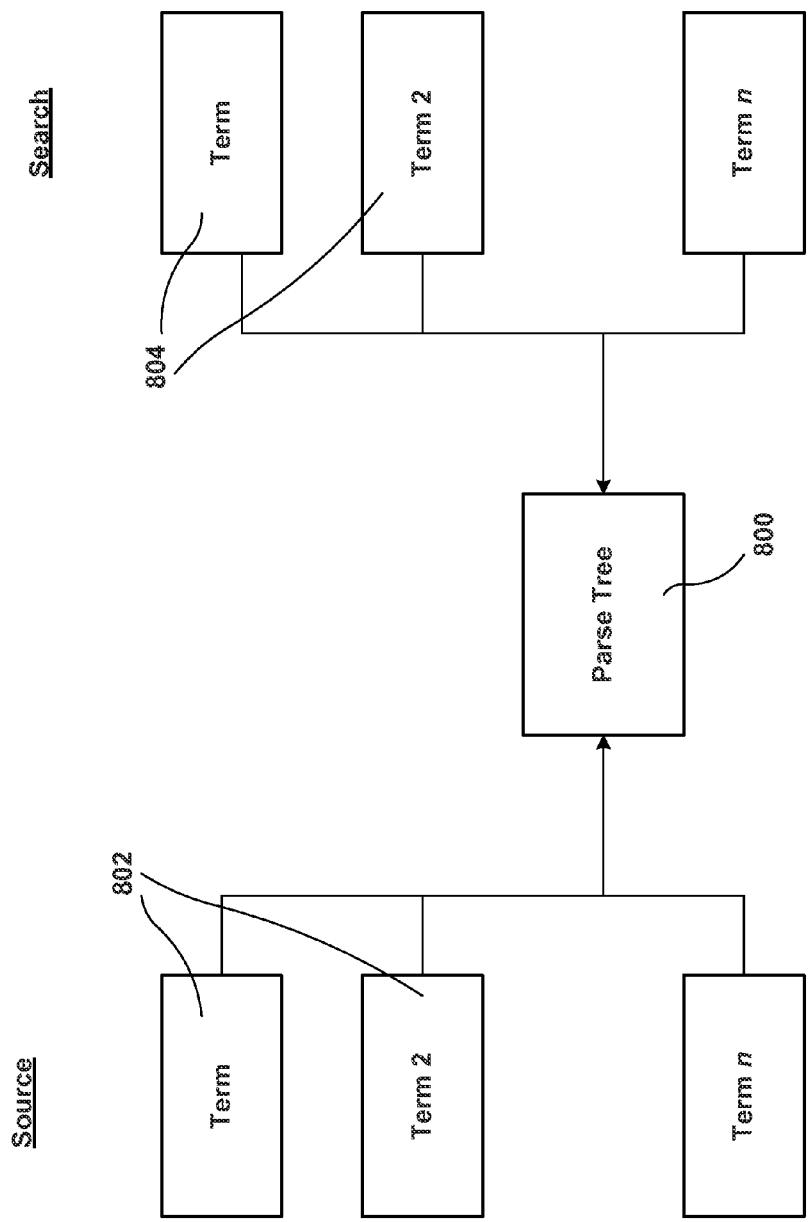
FIG. 8 is a schematic diagram illustrating a search application implemented in accordance with the present invention.

It will thus be appreciated that, in the illustrated embodiment, both source terms and potential search terms may be mapped to elements of the same parse tree structure. This is shown in FIG. 8. As shown, multiple terms 802 from the source collection are mapped to the parse tree structure 800. Similarly, multiple terms from the potential search term listing 804 are mapped to corresponding elements of the parse tree structure 800. In this manner, a particular search term entered by a user can be used to identify responsive information from the source collection based on a common classification or sub-classification despite the absence of any overlap between the entered search term and the corresponding items from the source collection. It will be appreciated that it may be desirable to link a given term 802 or 804 with more than one classification or classification lineage of the parse tree

800. This may have particular benefits in connection with matching a particular product or product category to multiple potential search strategies, e.g., mapping "pen" to searches including "writing instrument" or "office gift."

Figure 9:
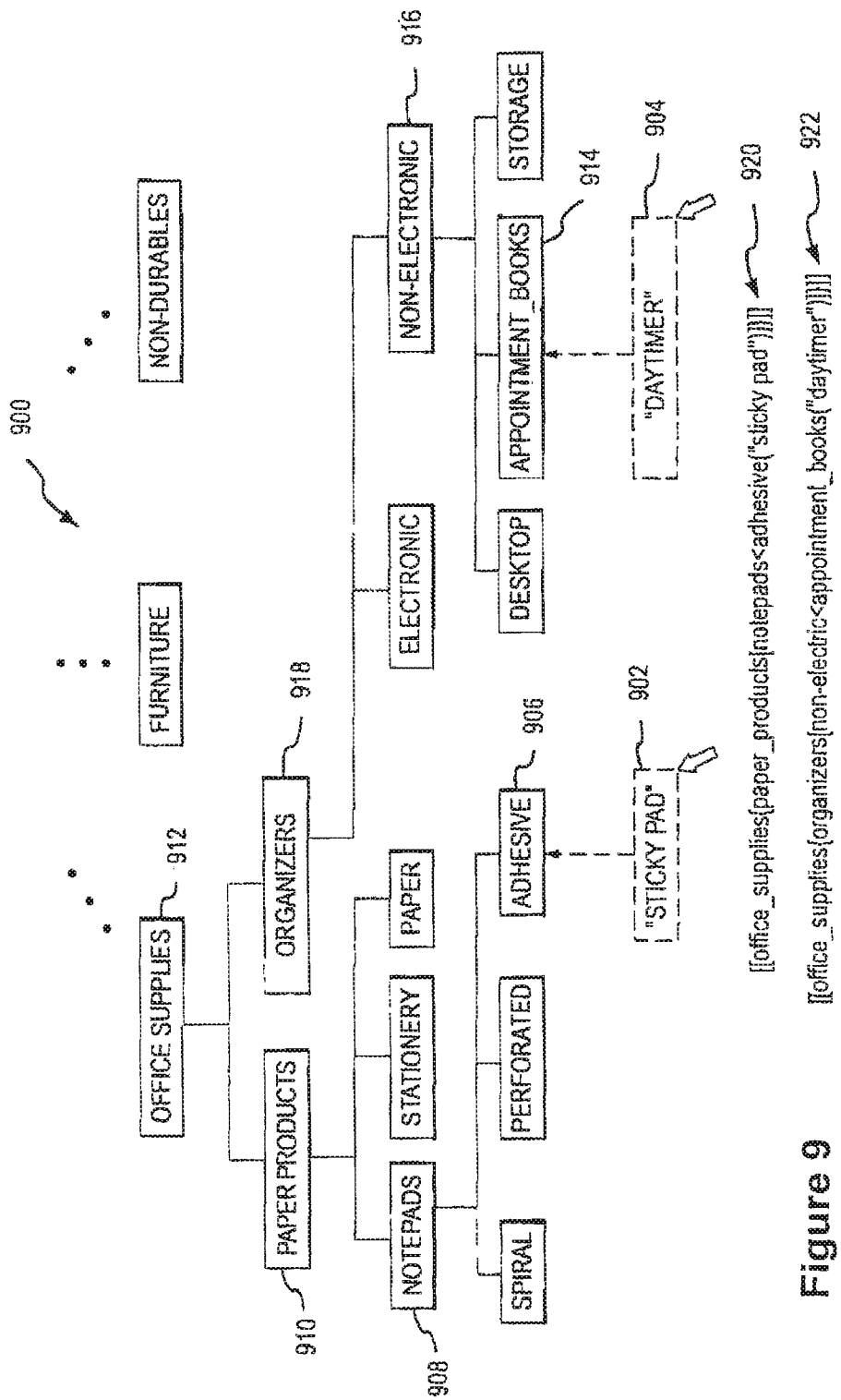
FIGS. 9 and 10 illustrate a classification system in accordance with the present invention.

An example of this process is shown in FIG. 9 with respect to particular search terms. In particular, FIG. 9 shows a user interface representing a portion of a parse tree 900 for a particular subject matter such as the electronic catalog of an office supply warehouse. In this case, string analysis tool 1500 may establish an association between search terms 902 and 904 and the parse tree 900. Specifically, search term 902, in this case "sticky pad" may be dragged and dropped on the node 906 of the parse tree 900 labeled "Adhesive" or associated therewith based on an identified similarity between "adhesive" and "sticky." This node 906 or classification is a sub-classification of "Notepads" 908 which is a sub-classification of "Paper Products" 910 which, finally, is a sub-classification of "Office_Supplies" 912. Similarly, term 904, in this case "Daytimer," may be associated with classification "Appointment_Books which is a sub-classification of "Nonelectronic" 916 which, in turn, is a sub-classification of "Organizers" 918 which, finally, is a sub-classification of "Office_Supplies" 3912. Data strings 920 and 922 illustrate the resulting structured terms reflecting the classification relationships (other syntax, such as standard XML tag syntax, may be used to reflect the classification structure). It will be appreciated that the example of FIG. 9 omits the optional step of term standardization. That is, the potential search term "Sticky Pad" may alternatively first be mapped to a standardized term such as "Post-it note" before being associated with the parse tree. Such standardization will be described in more detail below.

Figure 10:
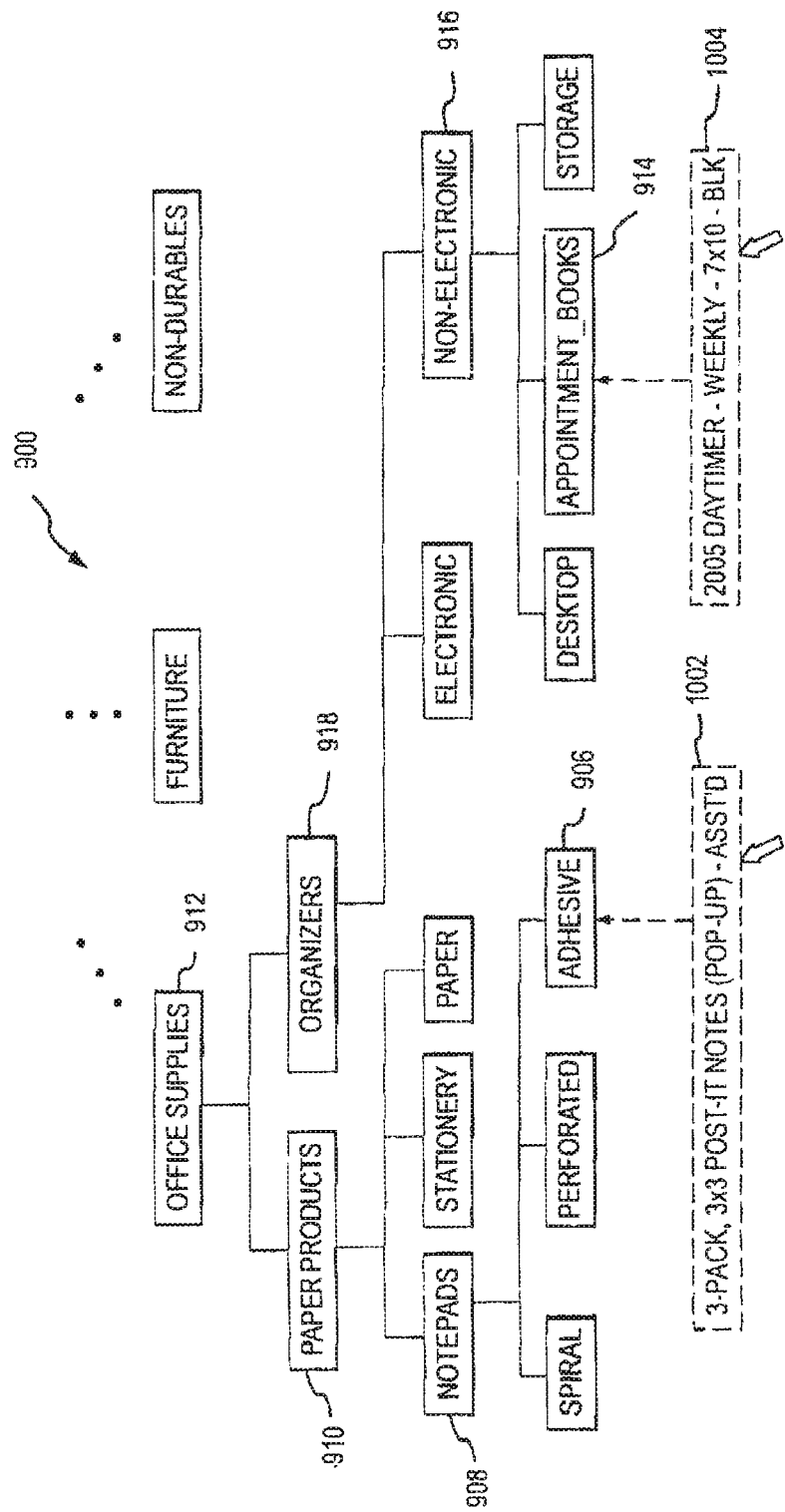

FIG. 10 illustrates how the same parse tree 900 may be used to associate a classification with items from a source collection. For example, such a source collection may be drawn from an electronic catalog or other database of the business. In this case, the source term 1002 denoted "3-pack, 3×3 Post-it notes (Pop-up)-Asst'd" is associated with the same node 906 as "Sticky Pad" was in the previous example. Similarly, term 1004 denoted "2005 Daytimer-Weekly-7×10-Blk" is associated with the same node 914 as potential search term "Daytimer" was in the previous example. As will be appreciated from the discussion below, such common associations with respect to the parse tree 900 facilitate searching.

Figure 11:
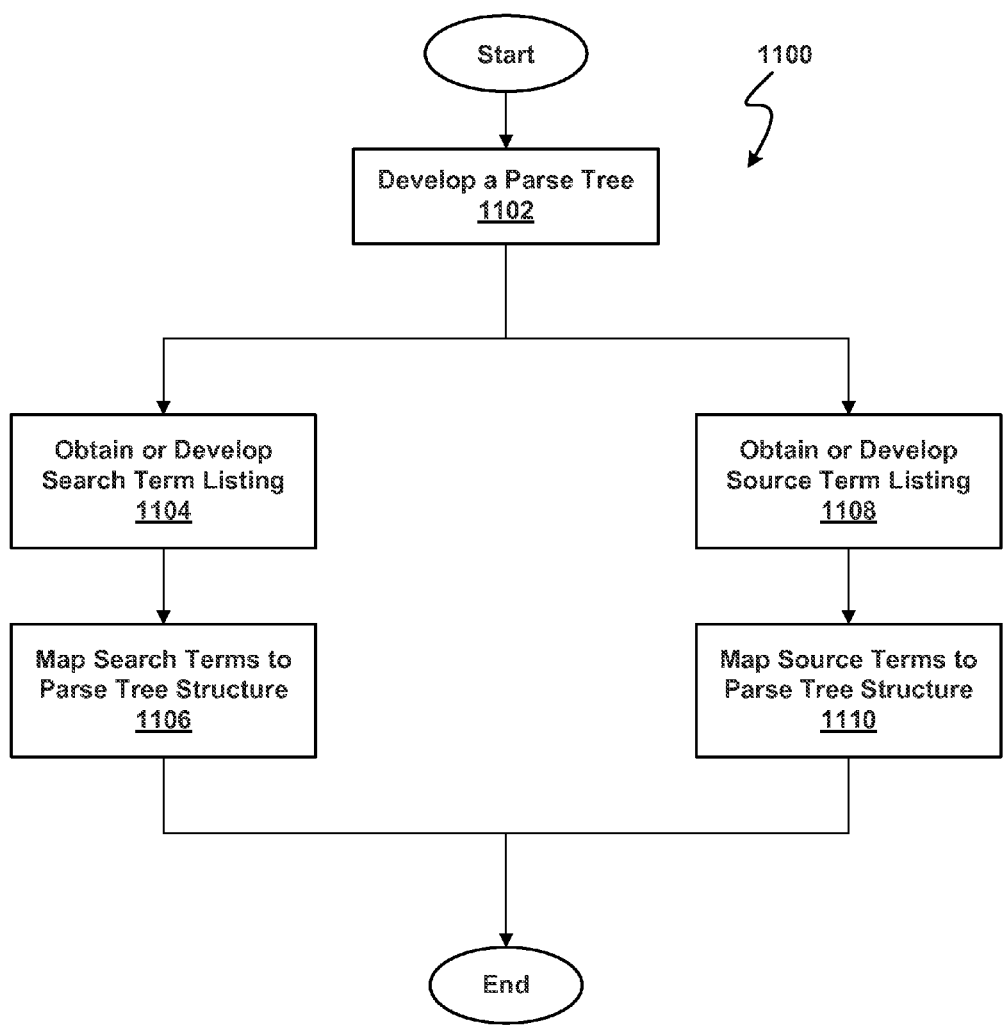
FIG. 11 is a flow chart illustrating a process for establishing a parse tree structure in accordance with the present invention.

This process for establishing a knowledge base may be summarized with respect to the flow chart of FIG. 11. The illustrated process 1100 is initiated by developing (1102) a parse tree that defines the subject matter of interest in terms of a number of classifications and sub-classifications. As noted above, such parsing of the subject matter may be implemented with enough levels to divide the subject matter to the desired granularity. The process 1100 then proceeds on two separate paths relating to establishing classifications for potential search terms and classifications for items from the source collection. It will be appreciated that these two paths may be executed in any order or concurrently. On the potential search term path, the process involves obtaining or developing (1104) a potential search term listing. As noted above, an existing list may be obtained, a new list may be developed, or some combination of these processes may occur. The terms are then mapped (1106) to the parse tree structure such as by matching similar terms to a node or existing members of a node or by a clustering process. On the source term process line, the process 1100 proceeds by obtaining or developing (1108) a source term listing. Again, the source term listing may be obtained from existing sources, developed by subject matter expert or some combination of these processes may occur. The individual terms are then mapped (1110) to the parse tree structure, again, for example, by way of similarity matching. Although not shown, the process 1100 may further include the steps of re-writing the potential search terms and source terms in a standardized form.

Figure 12:
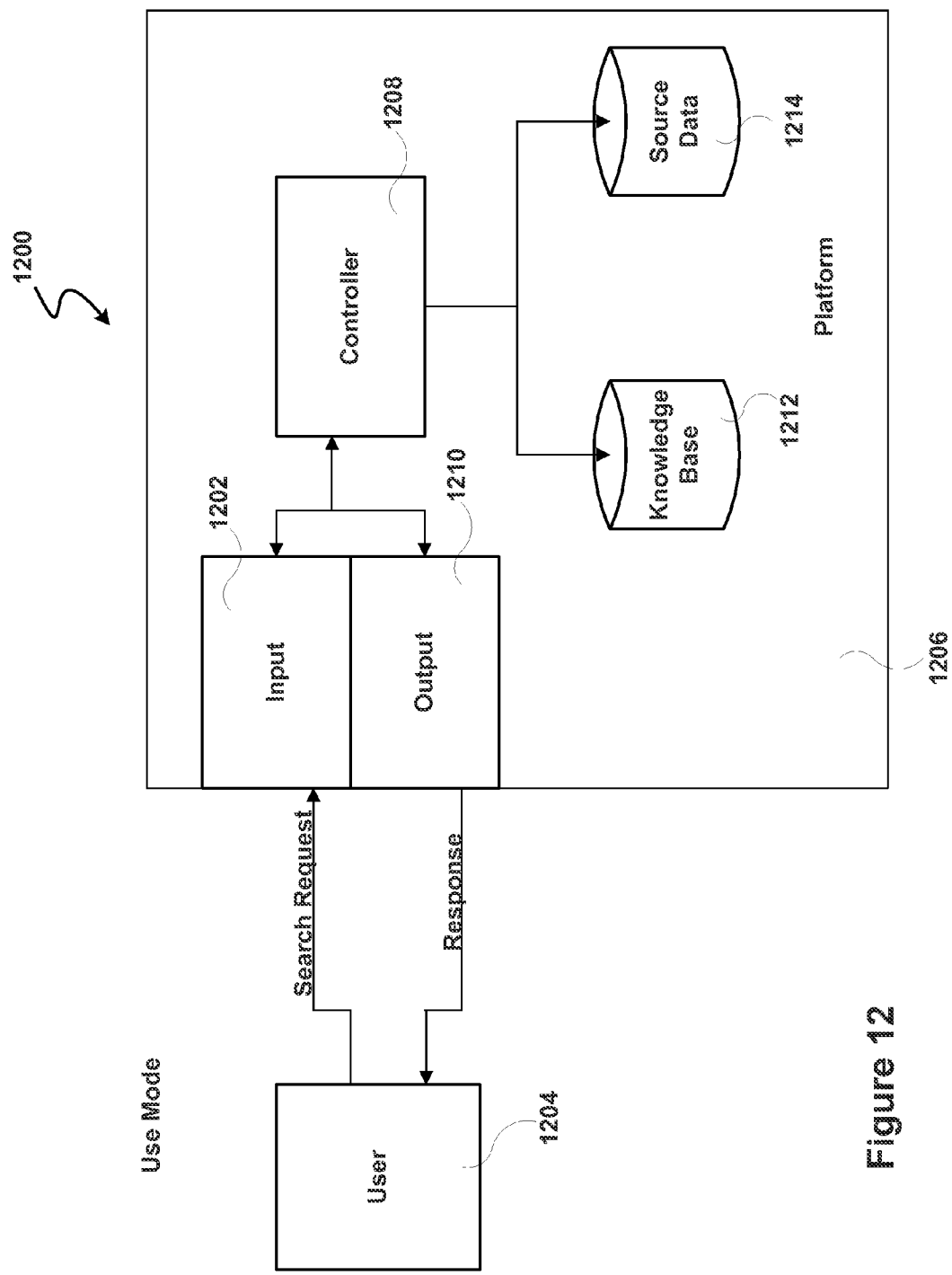
FIG. 12 is a schematic diagram illustrating a system for implementing a search application in accordance with the present invention.

The search system of the present invention is also operative in a use mode. This is illustrated in FIG. 12. The illustrated system 1200 includes input structure 1202 for receiving a search request from a user 1204. Depending on the specific network context in which the system 1200 is implemented, the search request may be entered directly at the machine executing the search system, or may be entered at a remote node interconnected to the platform 1206 via a local or wide area network. The nature of the input structure 1202 may vary accordingly. The search request is processed by a controller 1208 to obtain responsive information that is transmitted to the user 1204 via output structure 1210. Again, the nature of the output structure 1210 may vary depending on the specific network implementation.

In the illustrated implementation, in order to obtain the responsive information, the controller accesses the knowledge base 1212. The knowledge base 1212 includes stored information sufficient to identify a term from the search request, rewrite the term in a standardized form, transform the term if necessary, and obtain the metadata associated with the term that reflects the classification relationships of the term. The controller then uses the standardized term together with the classification information to access responsive information from the source data 1214.

Figure 13:
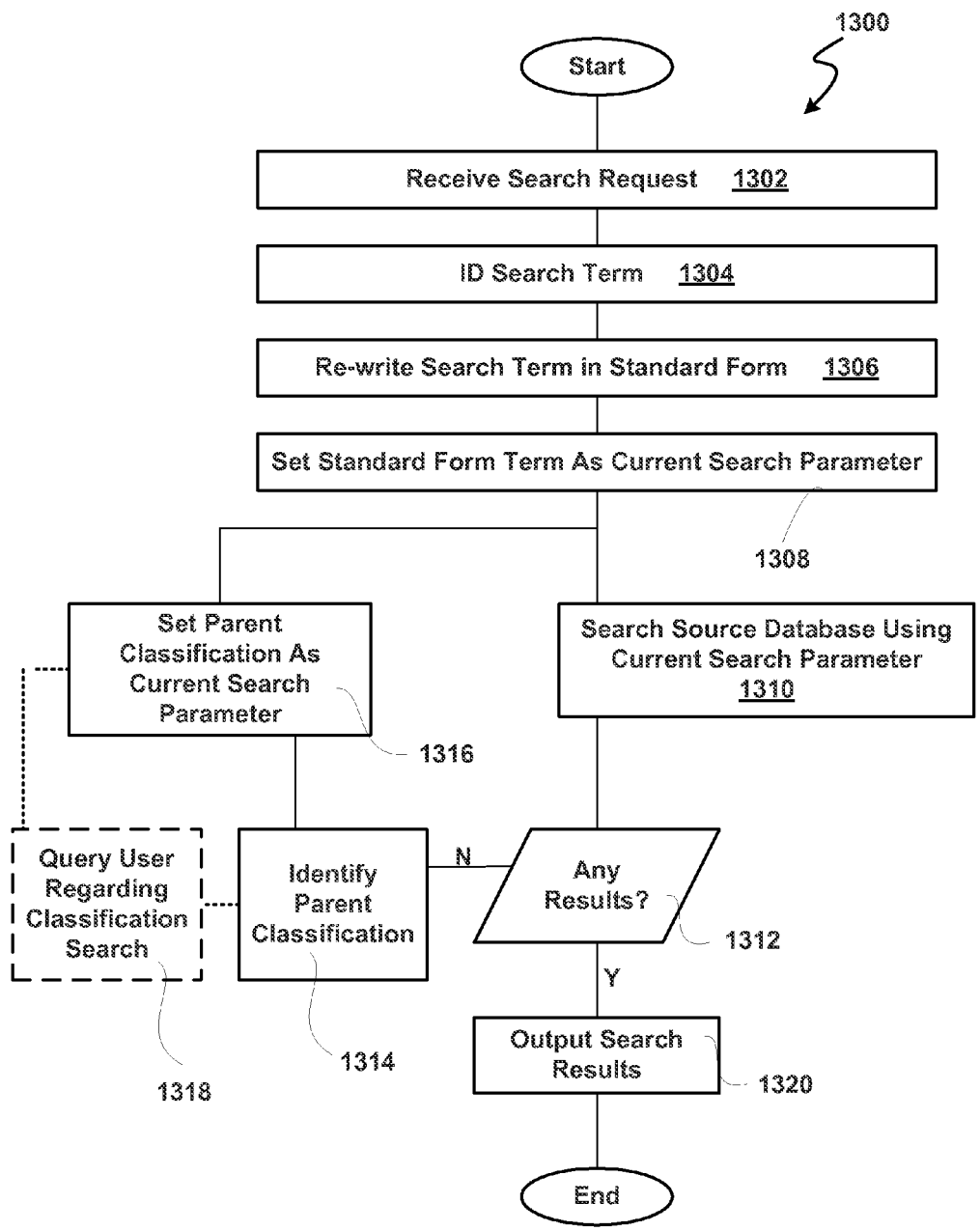
FIG. 13 is a flow chart illustrating a process that may be implemented by the system of FIG. 12.

FIG. 13 is a flow chart illustrating a corresponding process 1300. The process 1300 is initiated by receiving (1302) a search request, for example, from a keyboard, graphical user interface or network port. The system is then operative to identify (1304) a search term from the search request. In this regard, any appropriate search query syntax may be supported. For example, a search term may be entered via a template including predefined Boolean operators or may be entered freeform. Existing technologies allow for identification of search terms thus entered. The search term is then rewritten (1306) in standard form. This may involve correcting misspellings, mapping multiple synonyms to a selected standard term, implementing a predetermined syntax and grammar, etc., as will be described in more detail below. The resulting standard form term is then set (1308) as the current search parameter.

In the illustrated implementation, the search then proceeds iteratively through the hierarchy of the parse tree structure. Specifically, this is initiated by searching (1310) the source database using the current search parameter. If any results are obtained (1312) these results may be output (1320). If no results are obtained, the parent classification at the next level of the parse tree is identified (1314). That parent classification is then set (1316) as the current search parameter and the process is repeated. Optionally, the user may be queried (1318) regarding such a classification search. For example, the user may be prompted to answer a question such as "no match found—would you like to search for other products in the same classification?" In addition, the logic executed by the process controller may limit such searches to certain levels of the parse tree structure, e.g., no more than three parse levels (parent, grandparent, great grandparent) in order to avoid returning undesired results. Alternatively or additionally, such searching may be limited to a particular number of responsive items. The responsive items as presented to the user may be ordered or otherwise prioritized based on relevancy as determined in relation to proximity to the search term in the parse tree structure.

Figure 14:
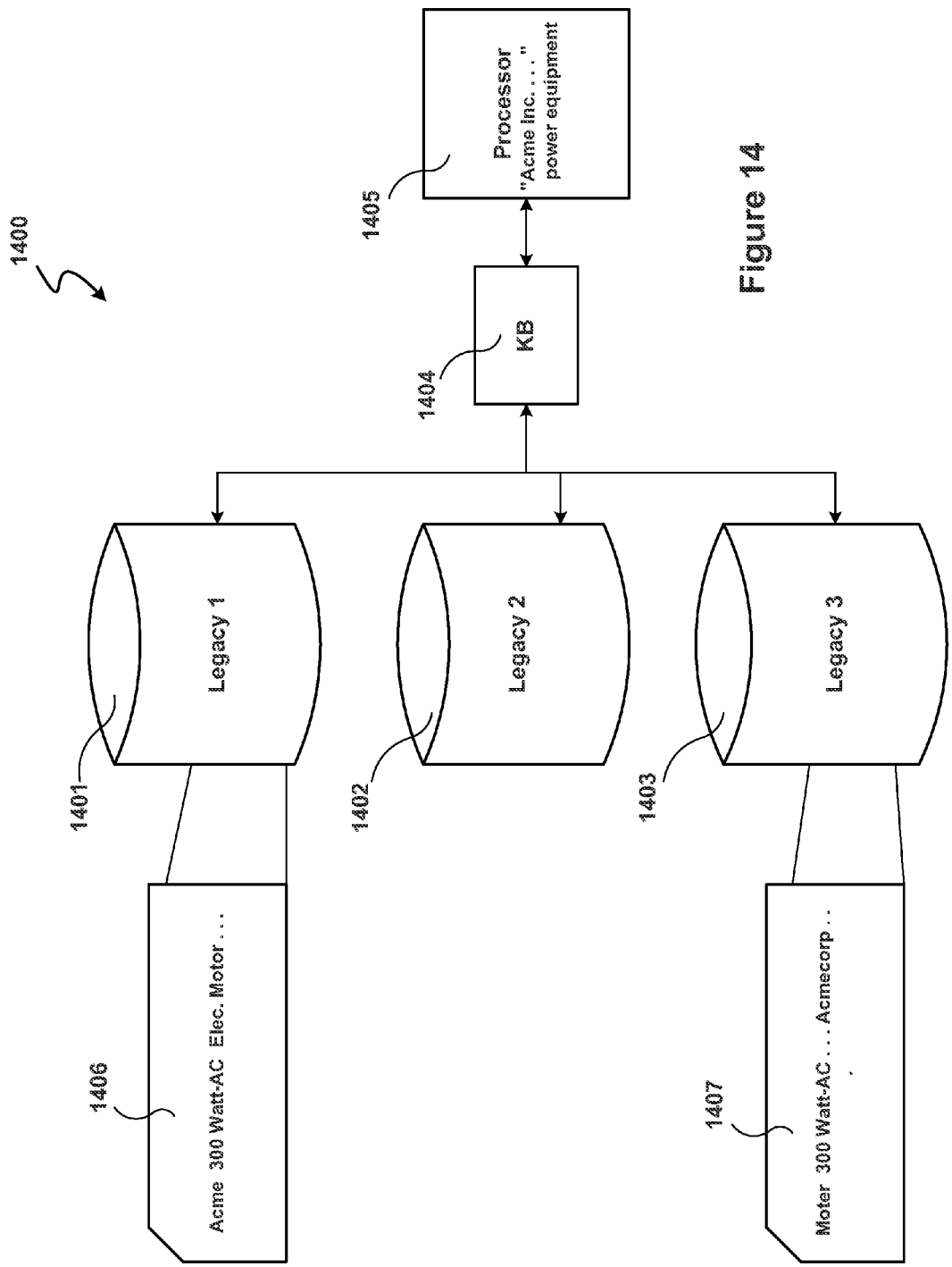
FIG. 14 is a schematic diagram illustrating a system using a knowledge base to process legacy information in accordance with the present invention.

It will be appreciated that searching functionalities such as discussed above is not limited to searching of a web site or electronic catalog by outside parties but is more generally useful in a variety of searching and database merging environments. FIG. 14 illustrates a system 1400 for using a knowledge base 1404 to access information from multiple legacy databases 1401-1403. Many organizations have related information stored in a variety of legacy databases, for example, product databases and accounting databases. Those legacy databases may have been developed or populated by different individuals or otherwise include different conventions relating to linguistics and syntax.

In the illustrated example, a first record 1406 of a first legacy database 1401 reflects a particular convention for identifying a manufacturer ("Acme") and product ("300W AC Elec.Motor . . . "). Record 1407 associated with another legacy database 1403 reflects a different convention including, among other things, a different identification of the manufacturer ("AcmeCorp") and a misspelling ("Moter").

In this case, an internal or external user can use the processor 1405 to enter a substantially freeform search request, in this case "Acme Inc. Power Equipment." For example, such a search request may be entered in the hopes of retrieving all relevant information from all of the legacy databases 1401-1403. This is accommodated, in the illustrated embodiment, by processing the search request using the knowledge base 1404. The knowledge base 1404 executes functionality as discussed above and in more detail below relating to standardizing terms, associating terms with a classification structure and the like. Thus, the knowledge base 1404 may first process the search query to standardize and/or classify the search terms. For example, Acme, Inc. may be associated with the standardized term "Acme." The term "Power Equipment" may be associated with the standardized term or classification "motor." Each of these terms/classifications may in turn be associated with associated legacy forms of the databases 1401-1403 to retrieve responsive information from each of the databases. Additional conventional functionality such as merge functionality may be implemented to identify and prioritize the responsive information provided as search results to the processor 1405. In this manner, searching or merging of legacy data systems is accommodated with minimal additional code.

From the discussion above, it will be appreciated that substantial effort is involved in transforming data from one form to another, e.g., from a raw list of potential search or source terms to a set or sets of standardized, classified and, perhaps, translated terms. The present system also accommodates sharing information established in developing a transformation model such as a semantic metadata model (SMM) used in this regard. Such sharing of information allows multiple users to be involved in creating the knowledge base, e.g., at the same time, and allows components of such information to be utilized in starting new knowledge base creation projects. This functionality is described in detail in U.S. Pat. No. 8,396,859 which is incorporated herein by reference in its entirety.

String Matching

As indicated generally above, the use of an indexed string matching process may be useful in a number of respects in the foregoing conversion process. As such, presented below are embodiments of indexed string matching that may be utilized in the foregoing conversion process or the embodiments of unsupervised machine learning discussed in greater detail below.

In the field of unsupervised machine learning, string matching, or the degree of overlap between two strings, is an important component for many data quality processes. In a simple example, two strings may differ in ways such as the perturbation of a single character. For instance, in the strings "Mississippi" and "Mississippe" differ with respect to a single character. However, differences between related strings may be much more complicated. Consider the following examples of source and target strings in the context of matching the source text to the target text.

| Source string | Target strings |
|---|---|
| 10 ohm 5% ¼ watt res | RES, CF ¼ WATT, 5% 10 OHM |
| | RES, CF ¼ WATT, 5% 100 OHM |
| | RESISTOR 5% ¼ WATT 10 OHM | or,

| Source string | Target strings |
|---|---|
| Chevrolet Division, General Motors | GM, Chevrolet Div |
| | General Motors, Chevy Div |

In these examples, simple string matching techniques may suggest that the source and target text strings are very different despite the fact that the meaning of the strings is similar or the same. The challenge previously faced in unsupervised machine learning environments is how to determine that these strings refer to the same things, and further, how to scale this solution to very large data sets.

Examples of prior approaches proposed for performing string matching analysis may include, for instance, deterministic matching and fuzzy matching. Deterministic matching involves a cascading sequence of match scenarios where when a match occurs, the sequence stops. Fuzzy matching algorithms attempt to match two strings typically through the use of a cost or distance function that is minimized. Each of these approaches has disadvantages. Thus there is a continued need for string matching analysis approaches.

The present disclosure generally relates to string analysis and implementations of string analysis in unsupervised machine learning environments. Embodiments of a tool for string analysis are described that provides techniques and optimizations that allow for fast implementation (e.g., at run-time). As such, even for extremely large data sets, string analysis may be performed efficiently at run-time such that the computational resources needed to perform the string analysis are minimized and the analysis occurs rapidly at run-time. Accordingly, a quantitative similarity metric may be provided that is indicative of the similarity between source and target strings that may be leveraged to provide support to an unsupervised machine learning environment in a plurality of applications. Such a quantitative similarity metric may be used in a variety of ways that may be leveraged in an unsupervised machine learning environment. For example, the analysis resulting in a similarity metric between a source and target strings may allow for matching, searching, and/or clustering of strings as tools to assist in a machine learning environment (e.g., one or more processes described above).

In this regard, in an embodiment, a computer-based string analysis tool may be provided for performing analysis of a plurality of strings. In various embodiments, the strings may correspond to different types of data. In an embodiment, the strings may correspond with text such as in the context of data quality applications. For example, the strings may correspond to product information (e.g., product information contained in legacy databases maintained by businesses). In other embodiments, the strings may represent or correspond to a plurality of other data sources and/or contexts such as documents, web pages, biological sequencing (e.g., DNA sequencing), random data sets, scientific data, or any other context where determining similarity between two strings may be beneficial for conversion of the data from a first form to a second form. For example, in the application of using string matching to identify external information (e.g., schema) for use in converting source data, the source data may comprise of a source string and the corpus of available external information may comprise target strings.

Generally, the string analysis performed by embodiments of the string analysis tool described herein may be used to determine the similarity (e.g., a quantitative similarity metric) between a source string and target string. In this regard, the similarity metric may be a numeric value that is indicative of the similarity between two strings. For example, a source string and target string that are completely identical may have a similarity metric of 100% or 1, while a source string and target string that are completely dissimilar may have a similarity metric of 0% or 0. As will be appreciated in the discussion below, the string analysis described herein may be used to enable search functionality, matching functionality, clustering functionality, or other data analysis based on the quantitative similarity metric between a source string and one or more target strings. As a result, a string similarity output may be generated that may be provided to an unsupervised learning environment such that the unsupervised learning environment may employ the string analysis tool in performing machine learning techniques or machine learning techniques may be applied to the string similarity output as will be described in greater detail below.

With reference to FIG. 15, an embodiment of hardware is shown that may be used to execute an embodiment of a string analysis tool 1500 described herein. In this regard, a processor 1540 may be provided that is in operative communication with a memory 1530. The memory 1530 may store one or more modules comprising the string analysis tool 1500 as will be described in greater detail below. In this regard, the string analysis tool 1500 and/or the modules comprising the string analysis tool 1500 may be stored as non-transitive computer readable instructions in the memory 1530. The non-transitive computer readable instructions may be accessible by the processor 1540 and capable of instructing a processor 1540 to perform functionality associated with each module comprising the string analysis tool 1500 as described below.

The processor 1540 may also be in operative communication with a display 1560. Further still, the processor 1540 may be in operative communication with a user control device 1570. In this regard, the processor 1540 may be operable to execute a user interface 1565 including a display portion displayed on the display 1560. Furthermore, the user control device 1570 may be operative to receive user inputs in connection with the user interface 1565. As such, the user interface 1565 may, at least in part, allow a user to interact or control the string analysis tool 1500.

The processor 1540 may also be in operative communication with a database 1550. The database 1550 may be operative to store, for example, source content 1510 and/or target content 1520. In an application, the source content 1510 may correspond to the source content 106 described above with regard to a conversion using frame-slot architecture or a parse tree structure. In addition, the database 1550 may store additional data including, for example, information regarding strings and/or features, probability data regarding strings and/or features, weighting parameters regarding strings and/or features, or other data that may be employed in the string analysis. Further still, the database 1550 may include data regarding unsupervised machine learning tools such as, for example, one or more modules corresponding to the foregoing conversion system 100 described above.

Figure 16:
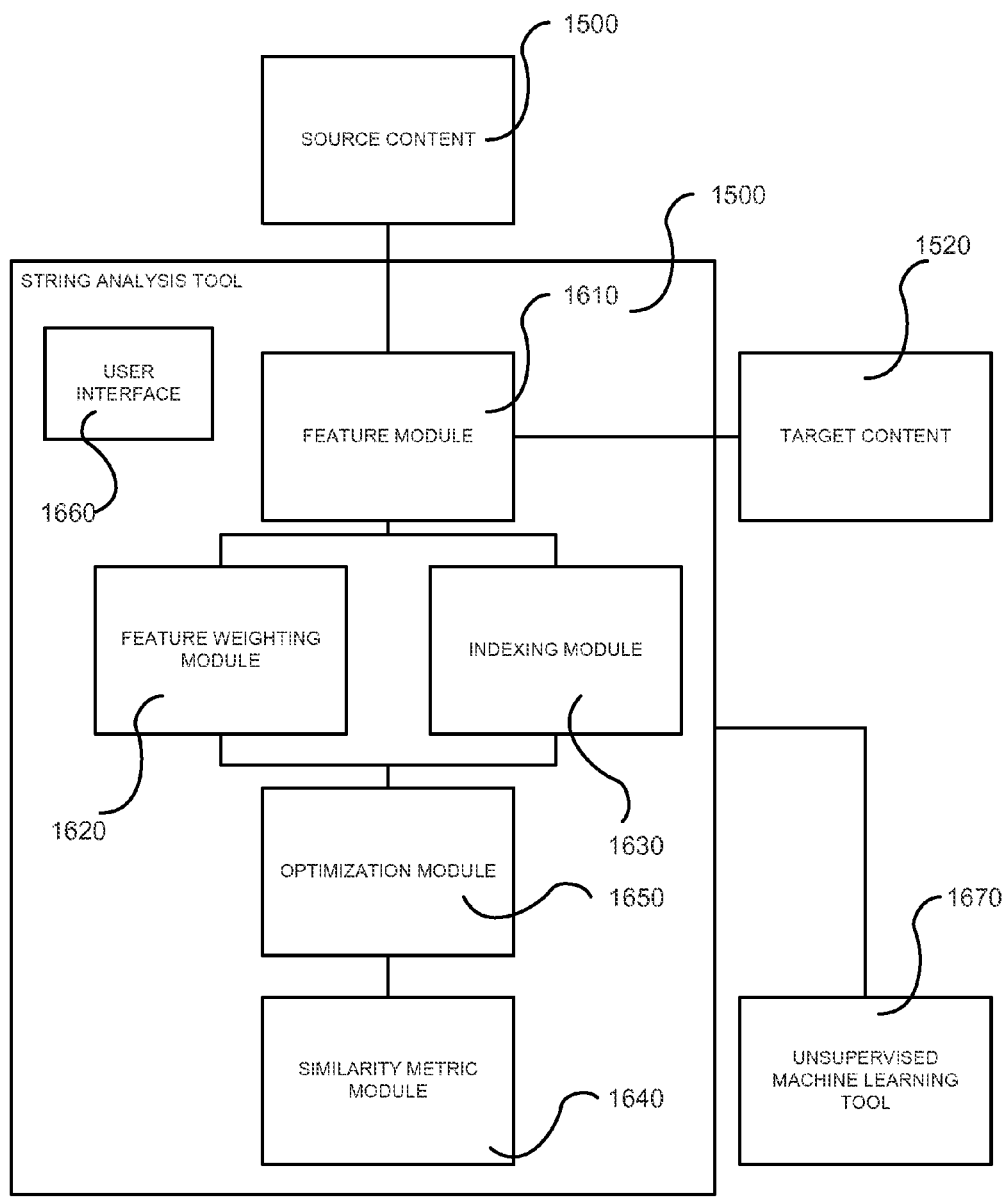
FIG. 16 depicts a schematic of an embodiment of a string analysis tool.

With reference to FIG. 16, an embodiment of the string analysis tool 1500 is depicted. The string analysis tool 1500 may comprise one or more components that may function to perform one or more different aspects of the string matching analysis described herein. As may be appreciated, the components described herein may correspond to one or more hardware or software modules capable of performing functions as described below. It may also be appreciated that while addressed separately for clarity, one or more components may be consolidated into a single component. Furthermore, additional distinct modules may be provided in addition to those described below.

Returning to FIG. 16, the string analysis tool 1500 embodiment may generally include a feature module 1610, a feature weighting module 1620, an indexing module 1630, and an optimization module 1640. The following description will contain a description of each module. Thereafter an exemplary analysis process is described.

The feature module 1610 may be operable to represent source or target strings as features. A feature may be any characteristic of the string that can be derived from the string or the data record from which the string is drawn. In this regard, a feature may leverage metadata associated with a string. The feature module 1610 may be operable to access source content 1510 or target content 1520. The source content 1510 may include or be operable to receive a source string for analysis. In this regard, the source content 1510 may be, in one embodiment, a query interface capable of receiving a query from a user. In another embodiment, the source content 1510 may be a portion of the target content 1520. For example, as will be described in greater detail below, a given target string from the target content 1520 may serve as a source string in the analysis. Further still, the source content 1510 may be a portion of some data to be converted from a first form to a second form.

With respect to the source content 1510 and/or target content 1520, as described above, the source content 1510 and/or target content 1520 may include strings representing a variety of different data types and/or data sources. In one embodiment, the source content 1510 and/or target content 1520 may include textual data. For example, the textual data may be representative of business data such as, for example, product descriptions, electronic catalogs, stock keeping data, accounting data, marketing data, or other textual information relating to the business.

In one embodiment, the feature module 1610 may be operable to represent strings as character n-grams, where each character n-gram corresponds to a feature. Character n-grams are fixed-width sequences of contiguous characters. Character n-grams may be easy to compute, context independent, and particularly suited to the context of text matching.

For example, one example of an n-gram that may be used to generate features is a trigram. A trigram has a fixed-width sequence of three characters. Thus, a string may be represented by a plurality of features corresponding to successive three character sequences of the string. For example, consider the string "RES 10 OHM ¼ WATT 5%." The string may be represented by a plurality of trigrams as follows: <B>re, res, es<E>, <B>10, 10<E>, <B>oh, ohm, hm<E>, <B>1/, ¼, /4<E>, <B>wa, wat, att, tt<E>, <B>5%, 5%<E>, where <B> indicates a leading space and <E> indicates at trailing space in the feature. As may be appreciated, the representation of the string as an n-gram may be domain and context independent such the feature generation may be applied without deference to the source, form, or context of the data, if identifiable. As such, it may be appreciated that feature generation may be applied to a variety of domains and contexts quite easily. The flexible architecture, however, also allows for fine-tuned customization for a given domain or data set.

In an embodiment, the feature module 1610 may be operable to represent a string as one or more features based on a word-level token found in a string. For example, the generation of features may leverage domain-specific knowledge. One example may be utilizing knowledge of how product part numbers or telephone numbers are constructed. In this regard, a listing of ten digit telephone numbers may utilize a known rule that the first three digits represent the area code for the number. Thus, the first three digits of each number may be used to generate a feature corresponding to the area code. The remainder of the number may be processed utilizing, for example, a different feature representation, such as an n-gram or other feature with the understanding those numbers may be random or lack the underlying meaning attributed to the area code. Additionally or alternatively, linguistic knowledge, taxonomy, grammatical, syntax, or other schema data may be used to generate features. Accordingly, features may reflect heuristics for common abbreviation strategies, textual structure features, or other linguistic knowledge may be used to represent strings as features.

The string analysis tool embodiment 1500 may also include a feature weighting module 1620. The feature weighting module 1620 may be in operative communication with the feature module 1610. As such, the feature weighting module 1620 may be operable to receive the features generated by the feature module 1610 based on the source content 1510 and/or target content 1520. The feature weighting module 1620 may be operable to provide each feature a weight that is used to determine how much a feature contributes (or does not contribute) to the string analysis. Examples of feature weighting may include, but are not limited to, giving each feature a score of 1.0 such that each feature contributes equally in the analysis, using frequency information regarding the feature from the source content 1510 and/or target content 1520 to weight the feature (e.g., using the negative log of the probability), or using the frequency rank of the feature.

One particular example of a weighting technique may include using a beta distribution over the frequency rank. In this context, high frequency features are given very little weight as the high frequency features tend to be uninformative. Very low frequency features may also be given very little weight because they tend to be noisy. As a result, a feature having a frequency below an upper threshold and above a lower threshold may be given a relatively large weight as those features may be informative and less prone to noise that high and low frequency features, respectively.

For example, when the target strings include documents, a trigram feature "the" may have a very high frequency in the target strings. That is, the term "the" may appear very often in the documents. However, the appearance of the term "the" may be very uninformative regarding the similarity of a source string containing the feature "the" and a target string containing the feature "the" due to the high frequency in the target documents. On the other hand, a feature "<B>z<E>" may have a very low frequency in the target documents. However, the existence of the feature "<B>z<E>" in the target documents may be subject to noise such that the appearance of the feature in the target documents may also be uninformative as to the similarity of a source string containing the feature "<B>z<E>" and a target string containing the feature "<B>z<E>". Thus, both features "the" and "<B>z<E>" may be given relatively low weights in the string analysis performed by the tool.

The tool embodiment 1500 may also include an indexing module 1630. The indexing module 1630 may be in operative communication with the feature module 1610 so as to receive the representations of source strings and/or target strings as features per the operation of the feature module 1610 as described above. The indexing module 1630 may be operable to calculate an index for each feature of a string or collection of strings. For example, an inverted index relating features to a plurality of strings may be created such that a mapping from each feature to every string that contains that feature is established. In this regard, the index may provide information regarding the relationship between a feature and one or more strings containing that feature (e.g., include a mapping between features and every string in a plurality of target strings including a given feature).

The tool embodiment 1500 may also include a similarity metric module 1640. The similarity metric module 1640 may be operable to calculate a quantitative similarity metric that describes the similarity between a source string and a target string. As discussed above, the similarity metric may be an intuitive similarity score between a source string and a target string that ranges between 0% and 100%. In this regard, a perfect overlap of the source string and target string may result in a similarity metric of 100%, whereas no overlap between the source string and the target string may result in a similarity metric of 0%. In other embodiments, there may be other fuzzy metrics used, such as a range 0 to 1, etc. Calculating the similarity metric for a given source string and the target string may include calculating a similarity metric based on commonality of features between the source string and target string using the feature representation described above with respect to the feature module 1610 for each string pair that is to be compared. In this regard, the similarity score may be computed by observing features that are shared between the source and target strings and/or by observing features that are present in one of the source or target strings, but that are not shared. Any one or more of a plurality of different similarity metrics known in the art may be employed. Examples include, but are not limited to, weighted average as a ratio of feature weights in common over all features, the Jaccard similarity index, a Bayesian approach that computes the probability of having features in common, etc. Further examples of potential similarity metrics that may be employed are discussed in Dekang Lin, *An Information-Theoretic Definition of Similarity*, ICML '98 Proceedings of the Fifteenth International Conference on Machine Learning, Morgan Kaufmann Publishers Inc., San Francisco, 296-304 (1998), which is incorporated herein by reference in its entirety.

The tool 1500 embodiment may also include an optimization module 1650. As depicted, the optimization module 1650 may be in operative communication with the feature weighting module 1620 and the indexing module 1630. The optimization module 1650 may be disposed between the similarity metric module 1640 and the feature weighting module 1650/indexing module 1630. As such, the optimization module may be operable to perform a number of optimizations relative to the features of the source string and/or target strings undergoing analysis. The optimizations performed by the optimization module 1650 may reduce the computational resources required to compute similarity metrics between a source string and a plurality of target strings. For example, in traditional string analysis, when determining a similarity metric between a source string and a target string, the process would involve calculating for each source string/target string pair a similarity metric. For very large target string corpuses, this may require the use of very large computational resources to accomplish such that the analysis may be prohibitive. For example, in matching external information such as public schema, private, schema, or other external data to source data to be converted, there may be a very larch campus of external information from a potentially large array of sources. As such, attempting to compare a given portion of source data to each portion of extend data may be unfeasible. Furthermore, many of the similarity metrics calculated for source string/target string pairs may be frivolous as the similarity metric for many source string/target string pairs may be uninformative or near zero.

However the optimization module 1650 may provide a more efficient process for determining similarity metrics by reducing the total number of similarity metrics that must be calculated for any given analysis between a source string and a plurality of target strings. In this regard, the optimization module 1650 may be operable to eliminate source features from consideration, eliminate of target strings from consideration, or may include removal of feature to string mappings from the index. It may be appreciated from the following discussion that any or all of these approaches may reduce the processing overhead expended by the similarity metric module 1640 associated with the generation of similarity metrics between a source string and a corpus of target strings. As will be discussed in greater detail below, the elimination of strings from consideration in the matching process may be based upon a minimum similarity metric. The minimum similarity metric may be a value that is predetermined (e.g., by a user). The minimum similarity metric may be adjusted to tune the optimization process to balance computational and time resources against comprehensiveness of the results. For instance, the minimum similarity metric may be applied to matching results as a minimum similarity metric threshold, where matches with similarity metric values falling below the threshold are eliminated from consideration.

For instance, a first optimization performed by the optimization module 1650 may be related to eliminating target strings from consideration in the similarity metric calculation that have no similarity with the source string. That is, the optimization module 1650 may employ the index compiled by the indexing module 1630 to determine which of the target strings include at least one common feature with the source string. As such, only target strings having at least one feature in common with the source string may remain for consideration. As such, the minimum similarity metric may be any value greater than 0.

Additionally, the first optimization technique performed by the optimization module 1650 may be extended by leveraging an important characteristic of the distribution of features common to many collections of strings. For example, features may generally follow a Zipfian distribution in which a few features occur very often and many features occur infrequently. Thus, the features for a target string will contain some features that are very frequently and others that are very infrequent. Stated differently, some features of the source string may retrieve many candidate target strings while other features may retrieve very few candidate target strings.

The optimization module 1650 may utilize the known frequency distribution obtained from the index such that target string candidate look up for high frequency features may be eliminated by establishing a minimum similarity metric threshold (e.g., based on or derived from a minimum similarity metric). In turn, the number of features from the source string that must be queried in order to guarantee that there will be no target strings missed that have a similarity metric above the minimum similarity metric threshold may be calculated.

Accordingly, once this calculated value related to the number of features needed to be queried to only return target strings having a similarity metric above the minimum similarity metric threshold is known, it may be used to eliminate the most frequent features of the source string from consideration such that the number of target string candidates may be greatly reduced. That is, given a reduction in the number of source features, a decrease in the number of target strings that may be returned having at least one source feature may also occur. While an exemplary approach to this optimization technique may be described in detail below, it will be understood that this approach may be applied to a wide variety of different kinds of features, feature weighing schemes, and similarity metrics that may be employed as alternatives to the specific techniques outlined below.

One exemplary application of a technique to reduce the number of source features is described below. The technique generally begins with:

$$sim(t_1, t_2) = \frac{2 * I(common(t_1, t_2))}{I(F(t_1)) + I(F(t_2))} \quad \text{Equation 1}$$

Where $t_1$ represents a source string, $t_2$ represents a target string, $common(t_1, t_2)$ is a function that returns the features that are common to both $t_1$ and $t_2$, and $F(t_1)$ is a function that returns the features of $t_1$. Also, in Equation 1, the value $I(F(t))$ may be express as:

$$I(F(t)) = \Sigma_{f \in F(t)} -\log_2 P(f) \quad \text{Equation 2}$$

$P(f)$ is simply the probability of a feature which can be calculated by dividing the number of times a feature appears in the target strings by the total number of times all features have been seen.

Equation 1 above may be rewritten to include weighting parameters relative to the source features or target features. As such, Equation 3 may be derived:

$$sim(t_1, t_2) = \frac{2 * I(common(t_1, t_2))}{w_1 * I(F(t_1)) + w_2 * I(F(t_2))} \quad \text{Equation 3}$$

Where $w_1$ and $w_2$ are weighting parameters. The weighting parameters may be modified so that the values behave as a weighted average such that $w_1$ and $w_2$ sum to 1. As a result, substituting the concept of a weighted average for the weighting parameters, Equation 4 may be derived:

$$sim(t_1, t_2) = \frac{I(common(t_1, t_2))}{w * I(F(t_1)) + (1-w) * I(F(t_2))} \quad \text{Equation 4}$$

In turn, the optimization technique described above where source features are removed from consideration may be employed with respect to Equation 4. As an initial step, Equation 4 may be rewritten as an inequality:

$$y < \frac{C}{w * A + (1-w) * B} \quad \text{Equation 5}$$

Where $y = sim(t_1, t_2)$, $C = I(common(t_1, t_2))$, $A = I(F(t_1))$, and $B = I(F(t_2))$. In this regard, rather than calculating Equation 4 for each source string/target string pair, Equation 5 may be used to determine which source features may be eliminated based on a minimum similarity metric threshold y. It may be known that the term w*A will not change for each source string/target string pair because w*A is dependent only on the source string. While the value of B cannot be calculated because it may be different for every source string/target string pair, the minimum value of the following ratio may be calculate in order to guarantee that Equation 5 maintains validity.

$$x = \frac{C}{w * A} \quad \text{Equation 6}$$

Equation 6 represents a value x, where it is determined how small x can be given B may be different for each source string/target string pair. If the minimum value of x can be determined, then the minimum value of C ($I(common(t_1, t_2))$) may be determined because A can be calculated for the source text alone. If the minimum value of C is known, then source features having values of C below the minimum value may be eliminated from consideration in the candidate lookup step described above where only target string sharing features common to source features remain for consideration. That is, only features may be looked up using the index that remain for consideration after the optimization. Therefore, x will be solved for in terms of y.

In order to accomplish this, the worst possible value (i.e. when B maximally constrains the ability to remove features from consideration) is considered. This happens to be when B=C. This means that B will contribute the maximum it can to the similarity score. Using this substitution and substituting A with its value given in Equation 5 (solving for A) Equation 4 becomes Equation 7:

$$y < \frac{C}{\frac{c}{x} + (1-w) * c} \quad \text{Equation 7}$$

Solving for x results in Equation 8:

$$x > \frac{y}{1 - y(1-w)} \quad \text{Equation 8}$$

Equation 8 is used for determining minimum required value of C in order for y to have any chance of being greater than the provided minimum similarity metric threshold. Given this minimum value of C, source features that do not need to be considered when determining candidate target strings from the index may be eliminated by considering only target strings having at least one common feature left for consideration.

One potential strategy is to sort the source features in order of descending frequency. A sum of the information of the source features in order may be calculated such that the sum does not exceed C. The remaining (and more informative) features are then used to gather candidate target strings from the corpus such that a similarity metric is only calculated between the source string and each of these candidate target strings determined from the index that share a feature with the remaining source features.

One example of the foregoing optimization technique may be applied for a corpus of target strings that have the following features whose respective information calculations are:

| Feature | P(F) | I(F) |
| --- | --- | --- |
| F1 | 0.00001 | 16.61 |
| F2 | 0.0001 | 13.29 |
| F3 | 0.001 | 9.97 |
| F4 | 0.01 | 6.64 |
| F5 | 0.1 | 3.32 |

Now, suppose a source string ($t_1$) has the following features $F(t_1)=\{F1, F3, \text{and } F5\}$ and one of the target strings has the following features $F(t_2)=\{F5\}$. The similarity of $t_1$ and $t_2$ is (assuming w=0.5):

$$sim(t_1, t_2) = \frac{3.32}{0.5*29.9 + 0.5*3.32} = 0.20$$

Assume another target string, $t_3$, which has the following features $F(t_3)=\{F1, F3, F4\}$. The similarity of $t_1$ and $t_3$ is:

$$sim(t_1, t_2) = \frac{26.58}{0.5*29.9 + 0.5*33.22} = 0.84$$

Given the high probability of the similarity between t1 and every target string that contains F5 (e.g., as much as 10% of the corpus if F5 never occurs twice in the same target text) may be required to be calculated. As may be appreciated, this represents a very high utilization of computational resources that may return only very small, uninformative similarity metrics. In contrast F3 and F5 may require calculating the similarity on 0.1% and 0.001% of the corpus, respectively. Thus using F5 to gather up similar candidates is both expensive and rather pointless (contrast the 20% similarity with the 84% similarity). So, a minimum score threshold of y=0.5 may be established to remove from consideration the source feature F5). The calculation of x from Equation 8 becomes:

$$x > \frac{0.5}{1 - 0.5(1 - 0.5)} = 0.667$$

The value for $A=I(F(t_1))$ may also be calculated as:

$A=I(F(t_1))=29.9$

The value for $C=I(common(t_1,t_2))$ may then be calculated:

$C=w*A*x=0.5*29.9*0.667=9.967$

Again, C represents the minimum amount of information that must be shared by the source string and the target string in order for the minimum similarity metric threshold to be reached. Again, this is for the worst case scenario where C and B are the same. This value of C can now be applied to the source string and eliminate features to use for gathering candidate target stings by referencing the index. For example, F5 (the most frequent feature of t1) can be eliminated because its information (value of C), 3.32, is less than 9.967. However, F3 (the next most frequent feature of t1) cannot be eliminated because the sum of F5 and F3 is 13.29 which is greater than C. Therefore, all texts will be gathered that have features F1 and F3 and calculate their similarity with T1. This represents approximately a 100 fold decrease in the number of candidates that must be considered because F5 is 100 times more common than F3.

Note that the information of F3 is slightly greater than C. So, the worst case scenario for a B that contains F3 would be $t_4$ such that $F(t_4)=\{F3\}$. Assuming the foregoing calculations to be valid, the similarity between $t_1$ and $t_4$ should be greater than the predetermined minimum similarity metric threshold of 0.5. Calculating the similarity metric between $t_1$ and $t_4$ results in:

$$sim(t_1, t_2) = \frac{9.97}{0.5*29.9 + 0.5*9.97} = 0.50013$$

As can be appreciated, the similarity metric between $t_1$ and $t_4$ is greater than the predetermined minimum similarity metric threshold of 0.5, which demonstrates that the elimination of source features from consideration results in target strings being retrieved from the index that can only return a similarity metric above a minimum similarity metric threshold. Thus, the number of similarity metric calculations that need to be undertaken can be drastically reduced by establishing and applying the minimum similarity metric threshold by the optimization module 150.

Another optimization technique that may be employed by the optimization module 1640 may be to establish a minimum similarity metric threshold as a parameter used to remove feature-to-string mappings from the index after the index has been created. For example, the number of features that must be mapped in order to guarantee that there will be no target string candidates missed for a given minimum similarity metric threshold may be established. Once the calculated value associated with the minimum similarity metric threshold is known, it may be used to remove feature-to-string mappings from the index. Again, while an exemplary approach for removal of feature-to-string mappings from the index is in detail below, it will be understood that this approach may be applied to a wide variety of different kinds of features, feature weighing schemes, and similarity metrics that may be employed as alternatives to the specific techniques outlined below.

Equation 5 is repeated here for convenience and will be referred to below as Equation 9:

$$y < \frac{C}{w*A + (1-w)*B} \qquad \text{Equation 9}$$

Where $y=sim(t_1,t_2)$, $C=I(common(t_1,t_2))$, $A=I(F(t_1))$, and $B=I(F(t_2))$. Again, $t_1$ represents a source string and $t_2$ is a target string instance which is found in the index. As stated above, the target strings as represented in the index containing mappings between features and strings may be examined to determine which target features are not to be mapped in the index for a given minimum score threshold and target string weight (e.g., as established by the feature weighting module 1620. In this regard, feature-to-string mappings may be removed from the index such that corresponding target strings having only features that have been removed from the index may not be returned as candidate target strings for which a similarity metric is calculated. In this approach, the minimum value of x in Equation 10 is calculated in order to guarantee that Equation 9 will remain true.

$$x = \frac{C}{(1-w)*B} \qquad \text{Equation 10}$$

The ratio of Equation 10 represents the notion of the minimum value of the value x that can be provided given A will vary for different source strings that may be received. If the minimum value of x can be calculated such that Equation 9 remains true, then the minimum value of C may be determined because B can be calculated for each target string in the index prior to receipt of any source string. Thus, if the minimum value of C is known, then features from the index may be eliminated corresponding to target features that do not exceed the minimum value of C.

The worst possible value for A occurs when A=C (i.e. when A maximally constrains the ability to remove features from consideration). This means that A will contribute the maximum it can to the similarity score. Using this substitution and substituting B with its value given in Equation 10 (solving for B) Equation 9 becomes:

$$y < \frac{C}{w*c + \frac{c}{x}} \qquad \text{Equation 11}$$

Now x can be solved for in terms of y which results in:

$$x > \frac{y}{1 - y*w} \qquad \text{Equation 12}$$

Equation 12 may now be used for determining minimum required value of C such that y has any chance of being greater than the provided minimum similarity metric threshold. Given the calculated minimum value of C, features of the target strings ($t_2$) that can be eliminated from the index can be identified. One strategy is to sort the features of $t_2$ in order of descending frequency. The information of the features in that order may be summed such that the sum does not exceed the value of C that was calculated. Accordingly, the remaining (and more informative) features are left in the index for consideration in the calculation of similarity metrics between an identified source string and the target strings based on the pruned index where features have been removed as per the foregoing. To generalize the operation of this optimization, the smaller the value of w (the weight parameter for the source string) the more target features can be removed from the index. Similarly, the larger the value of y, the more features can be pruned from the index.

Figure 17:
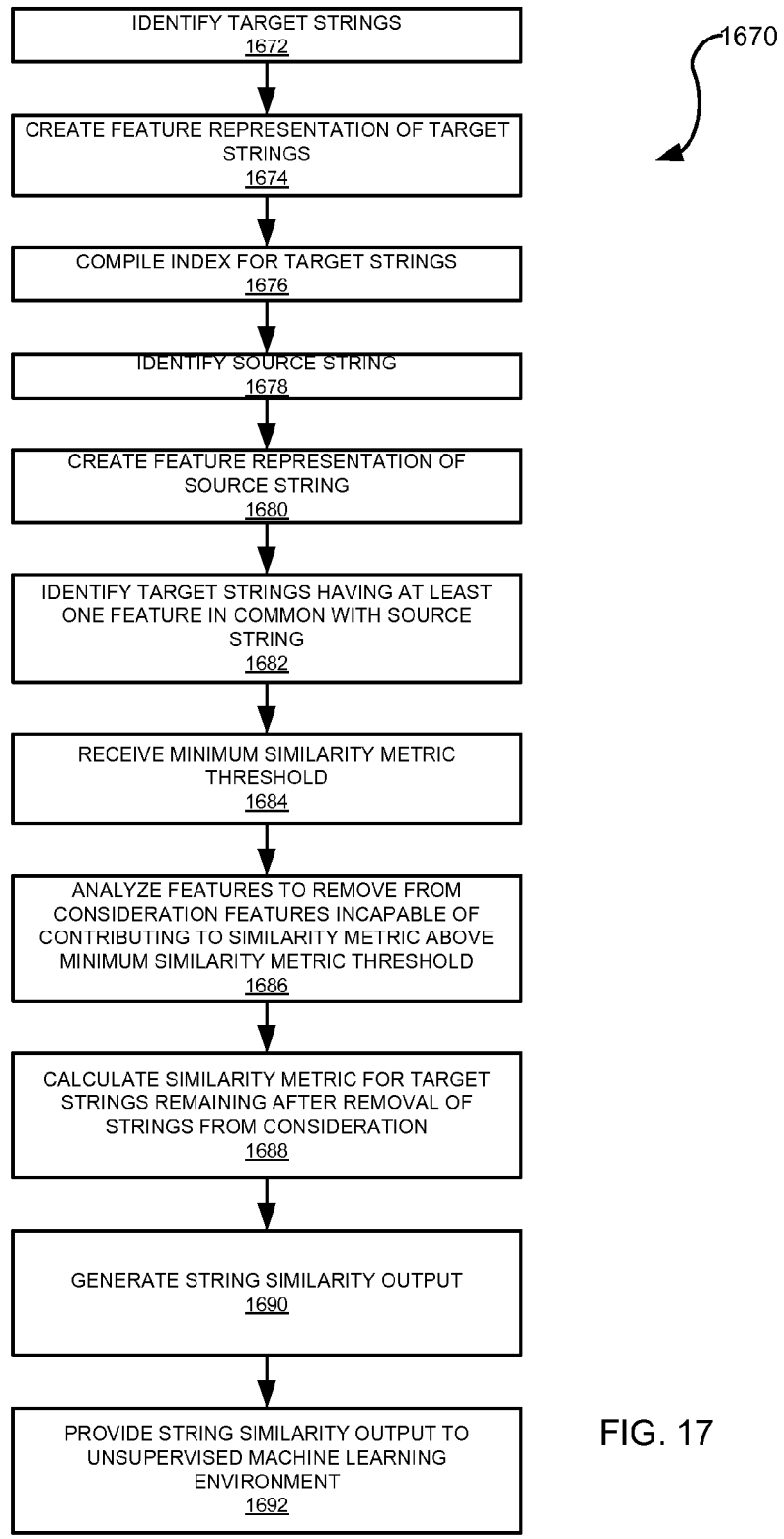
FIG. 17 depicts a flow chart of an embodiment of a string analysis process.

Returning to FIG. 17, the string analysis tool embodiment 1500 may include a user interface 1660. The user interface 1660 may include display and/or input features through which a user may interact with the string analysis tool 1500. In this regard, various elements of the foregoing description may be controllable by a user via interaction with the user interface 1660. For example, identification and/or receipt of a source string may be provided by a user via the user interface 1660. Furthermore, predetermined values such as the minimum similarity metric threshold may be input by the user via the user interface 1660. Furthermore, the string similarity output may be displayed to the user via the user interface 1660.

In this regard, the foregoing string analysis tool including the optimization techniques described above may be used to perform string analysis at run time in an efficient and rapid manner. In this regard, the foregoing approach may leverages benefits of both deterministic-type and fuzzy logic-type analysis in that deterministic-type decisions may be made to eliminate features from consideration in the analysis, while fuzzy logic-type analysis that is domain and context independent may also be carried out to provide similarity metrics between source and target strings. As such, the foregoing string analysis may be used in a number of contexts where similarity analysis of strings may be useful.

One embodiment of an exemplary string analysis method 1670 is depicted in FIG. 18. The method 1670 may include identification 1672 of a plurality of target strings. As described above, the target strings may correspond with a plurality of different data types and/or data sources. The method 1670 may also include creating 1674 a feature representation of the target strings (e.g., as described above with respect to feature module 1610). The method 1670 may also include compiling 1676 an index for the target strings. Again, the index may include mappings between target features and target strings including each target feature as described above with respect to the indexing module 1630.

The method 1670 may also include identifying 1678 a source string. As described above, the source string may correspond to a search query, a portion of data desired to be analyzed in view of the target strings, or even a target string analyzed in view of others of the target strings. The method 160 may include creating 1680 a feature representation for the source string. The features representing the source string may be similar to or different than the features of the target string. In any regard, the method 1670 may include identifying 1682 target strings having at least one feature in common with the source string. As such, in a similar manner as that described above with respect to the optimization module 1640, only those target strings mapped to features present in the source string as determined with reference to the precompiled index may be returned.

In a further portion of the method 1670, a minimum similarity metric threshold may be received 1684. The minimum similarity metric threshold may correspond to a minimum value for the similarity metric to be calculated for target strings relative to the source string. That is, the minimum similarity metric threshold may be a value such that target strings having a value below the minimum similarity metric threshold may not even have a similarity metric calculated. As such, the method 1670 may include analyzing 186 feature (e.g., of either the source string or target string) that may be removed from consideration because the features are incapable of contributing to a similarity metric above the minimum similarity metric threshold. For example, the above described processes or other processes utilizing other similarity metrics may be used in the analysis to determine which features are incapable of returning a similarity metric above the minimum similarity metric threshold. As such, the method 1670 may include calculating 1688 similarity metrics relative to the source string only for those target strings that based on the analysis 1686 have similarity metrics exceeding the minimum similarity metric threshold.

Furthermore, as will be described in greater detail below, the method 1670 may include generating 1690 a string similarity output. The string similarity output may be the similarity values for each target string that were calculated 1688, one or more matched target strings, a target string cluster, or other data related to the calculated 1688 similarity metrics. In this regard, the method 1670 may, as will also be described in greater detail below, include providing 1692 the string similarity output to an unsupervised machine learning environment or tool.

One context where such string analysis may be useful is in the context of a search. In this regard, a search query may be received as a source string. A searchable corpus of may correspond to the target strings. In this regard, the target strings of the searchable corpus may be represented as features in the manner described above. Furthermore, an index inducing feature-to-string matching may be created. For example, the index may be compiled prior to receiving the search query.

In this regard, the foregoing string matching analysis may be performed using the index in conjunction with one or more optimization techniques to return search results in far less time that would be required in traditional searching methods. For example, in previous fuzzy logic approaches, a similarity metric may be required to be calculated for each target string with respect to the source string. However, utilizing the foregoing string analysis, selected features from the query and/or target features mapped in the index may be eliminated from consideration in the analysis. Thus, far less similarity metrics may be required to be calculated when returning search results from the target strings (the searchable corpus) based on the source string (the search query. In this regard, in the context of the search, a number target strings may be returned as results in the search. For example, a predetermined top number of search results, results with a similarity metric above some threshold value, or an ordered list of results (e.g., arranged by descending similarity metrics) may be returned in response to the search query.

In another embodiment, the foregoing string analysis may be used in the context of matching a source string to a target string. In this regard, like in the context of a search, after the source string and target strings have been represented as features and an index of feature-to-string mappings has been complied, selected source features and/or target features may be identified for elimination from consideration when calculating a similarity metric such that a similarity metric need not be calculated for each target string and the source string. Accordingly, one or more matched target strings may be returned as matches to the source string. For example, target strings having a similarity metric above a certain threshold value may be designated as matches. Alternatively, the target string having the highest similarity metric may be returned as the match for a source string.

In still another embodiment, the foregoing string analysis may be used to return grouped or clustered strings from the target strings that are highly similar. For example, as described above, a plurality of target strings may be stored or received as target content 1520. Each of the target strings may be represented as features. An index including a feature-to-string mapping may be compiled for the target strings.

Additionally, each one of the target strings may have a similarity metric calculated in accord with the foregoing with respect to others of the target strings. That is, each target string may be used as a source string in a string analysis as described above. In this regard, each string from the target strings may have a similarity metric calculated with respect to other strings in the target strings. This process may include the optimization techniques described above such that a similarity metric for any given target string may only be calculated with a portion of the other target strings based on the removal of features from consideration based on a minimum similarity metric threshold.

Once the similarity metrics have been calculated for the target strings, related target strings (i.e., strings with relatively similarity metrics with respect to one another) may be clustered. The clustering of stings may include clustering all strings from the target strings that exceed a predetermined threshold value with respect to one another. Any method may be used to cluster target strings based on the similarity metrics provided. One such example of a target string cluster 1900 is shown in FIG. 19.

It may be appreciated that the string analysis tool embodiments may also be conjunction with an unsupervised learning environment (e.g., in the context of big data environments). In this regard, the string analysis tool may be used in the course of unsupervised machine learning (e.g., to determine matches between a source string and target string) or the string analysis tool may be used to "clean" data (e.g., order data into clusters) prior to the unsupervised machine learning being applied to the data. Accordingly, the string analysis may be used alone or in conjunction with other techniques in an unsupervised learning process (e.g., to "learn" hidden structures from a corpus of data for which little or nothing is known, to determine matches between a source form and a target form, etc.).

Application of String Matching to Unsupervised Learning

In this regard, the string analysis may provide a string similarity output corresponding to one or more of a match, a plurality of search results, or string clusters as described above. The string similarity output may then be provided to an unsupervised learning environment. The unsupervised learning environment may include a plurality of machine learning tools for performing techniques that may leverage the string analysis tool or utilize a string similarity output as inputs into the unsupervised learning environment. For example, the machine learning techniques may discern meaning from the data, organize the data (e.g., into hierarchical classes), create or apply rules regarding the data, or other machine learning techniques.

For example, one particular context in which the foregoing techniques may be employed is in the field of legacy database operations. That is, many organizations have information stored in a variety of legacy databases, for example, product databases containing product listings and attributes. It may be appreciated that legacy databases may have been developed or populated by different entities or otherwise include different conventions relating to linguistics and syntax. As may be appreciated in the following, the string analysis described herein may be leveraged in various machine learning techniques. Examples of machine learning techniques that may be used in conjunction with the string analysis tool described herein include various techniques described in U.S. Pat. No. 7,865,358, U.S. Pat. No. 7,536,634, U.S. Patent Publication No. 2009/0281732, and 2011/0093467, each of which is commonly owned with the current assignee and each of which is incorporated by reference herein.

In an embodiment, the unsupervised learning environment may apply one or more external knowledge source to the string similarity output. For example, the external knowledge source may include a dictionary, a term glossary, grammatical rules, a known syntax, a schema (e.g., public or private), frame-slot architecture, or some other external source of knowledge. For instance, matching techniques may be used to determine applicability of the external knowledge source to all or a portion of the string similarity output.

For example, as described in the above references incorporated herein, in some instances, a semantic metadata model may be developed to facilitate data transformation. The semantic metadata model may utilize contextually dependent rules and terminology to improve transformation accuracy between a source form and a target form. In this regard, the semantic metadata model may employ a taxonomy defining relationships between terms or items. Oftentimes the taxonomy for a semantic metadata model must be tediously created by a subject matter expert with knowledge of the context of the data.

In contrast, it is contemplated that, in one embodiment described herein, the string analysis tool 100 described herein may be employed to provide an input capable of undergoing unsupervised machine learning. For example, the cluster 200 shown in FIG. 4 may be generated from a plurality of text strings regarding a product database using the string analysis tool 100 as described above. The cluster 200 may be provided to an unsupervised machine learning environment. In this regard, the machine learning environment may be operative to derive a taxonomy 210 from the cluster as shown in FIG. 5. The taxonomy 210 shown in FIG. 5 may comprise a portion of a larger taxonomy derived from the cluster with some portions not shown for clarity. As may be appreciated, given the cluster 200 includes a plurality of strings that are similar in nature, many of the subclasses appearing in the taxonomy 210 may be derived from an analysis of the cluster 200. For example, it may be recognized using the unsupervised machine learning that each string in the cluster 200 corresponds to a product list for batteries as "BATTERIES" appears in each of the related strings. Further subclasses may be derived recognizing features common to smaller subsets of the clustered strings. For example, it may be determined that a number of the strings deal with a type of battery, "ULTRA-VOLT" based on the appearance of this feature or a similar feature in the string. As such, a class for Ultra-Volt products may be generated. Strings lacking this feature or a similar feature may be attributed to a "REGULAR" subclass in the taxonomy 210. The creation of the taxonomy of the cluster 200 may be further developed by recognizing the presence of features in the strings related to, for example, battery voltages, package types, and number of batteries per pack as shown in the taxonomy 210.

Of particular interest is the fact that this taxonomy 210 may be derived from the cluster 200 without any contextual knowledge regarding batteries or battery packaging. That is, the parsed structure of the strings belonging to the cluster 200 may provide the unsupervised machine learning sufficient context to develop the taxonomy without the intervention of a subject matter expert. In this regard, the taxonomy may be applied to a plurality of clusters to develop separate or integrated taxonomies that describe the larger corpus of target strings from which the cluster 200 was derived.

Furthermore, upon generation of additional taxonomies with respect to other clusters, the unsupervised machine learning environment may leverage the matching techniques of the string analysis tool 100 to match developed classes or subclasses with other cluster taxonomies to integrated separate taxonomies created based on individual clusters. Other ways of utilizing the string analysis tool embodiment 100 in an unsupervised machine learning environment may also be provided. For example, matching strings to known dictionary entries for a term may be accomplished by the machine learning environment by using the string analysis tool 100. For example, particular target strings may contain many instances of the string "PRNTD CRCT BRD," and a dictionary employed by the machine learning environment may contain the entry "PRINTED CIRCUIT BOARD." However, because the machine learning environment may not recognize that "PRNTD CRCT BRD" is a form of "PRINTED CIRCUIT BOARD" (even though this may be apparent to a human), the machine learning environment may fail to recognize the relationship between the strings.

However, the string analysis tool embodiment 100 may be employed to match "PRNTD CRCT BRD" to "PRINTED CIRCUIT BOARD" such that the machine learning environment may recognize the two as being related or the same. In this regard, the machine learning tool may set each entry in the dictionary as source strings for input into the string analysis tool 100. Upon execution of the string analysis tool 100, the similarity metric between source strings corresponding to entries in the dictionary of the machine learning tool 100 and target strings may be used to identify related or corresponding forms, even absent one to one identity between the strings.

Further uses of the string analyses tool embodiment 100 to generate inputs into a machine learning environment or for use in a machine learning environment are contemplated. For example, the string analysis tool 100 may be used in correlating or interpreting an external input (such as a search query) in relation to one or more defined collections of information; correlating or interpreting an external input in relation to one or more external documents, files, or other sources of data; facilitating exchanges of information between systems; translating words, phrases or documents; generation or application of public or private schemas with respect to data that is otherwise incoherent or unorganized; recognition of contextual information; recognition of frame/slot architecture in data; generation of valid attributes and/or attribute values; or other machine learning functions that may be leveraged or facilitated by using matching, searching, or clustering as described above.

For instance, in an embodiment, one or more of the features described in relation to the indexed string matching process described above may be utilized in an unsupervised learning environment for the conversion of source data from a first form to a second form. For instance, the first step, the source data may be subjected to a clustering process whereby one or more subsets of data may be identified within the source data as a whole. In this regard, each portion of the source data (as a source string) may be compared to each other portion of the source data (as target strings) such that similar data within the source data may be grouped or clustered as described above. As may be appreciated, because the features of the source data may be indexed prior to the clustering process, the competition resources needed to perform the clustering process may be reduced in accord with the optimization process described above. Based on the similarity of the clustered subsets of data from the source data, it may be assumed that the clustered data all belongs to the same context usage in the source data. Thus, even for source data collections with many different contextual usages provided, each clustered subset of data may be treated independently to match each subset of data to a corresponding external portion of information for contextually dependent conversion thereof.

In this regard, once the source data has been cluster, the unsupervised learning tool may employ the index string matching with respect to each of the subsets of data clusters identified from the source data to perform a matching process to determine external data with similarities to the subset of the data. In this regard, the matched external data may be available for application to the particular subset of the source data for use in conversion of the source data from a first form the second form. For example, in one implementation, one or more public and/or private schemas that are contextually dependent may be set as target strings to which source strings comprising the clustered source data may be compared via the indexed string matching process to generate similarity Index according the foregoing process.

As such, a selected public and/or private schema may be matched to the source data by virtue of the similarity between the subset of the source data and the selected schema. Again, it may be appreciated that this matching may be performed absent any reference to the context of either the selected schema or the source data such that the matching may be performed solely on the basis of similarities between the features of the source data in the schema to be applied in the conversion. In turn, once the schema has been identified for application of the source data based on the indexed string matching, the schema may be utilized as described above in relation to conversion using the frame slot architecture or parse tree structure to convert the source data for first form the second form.

Notably, in contrast to prior unsupervised machine learning environments, it may be unnecessary to identify particular context of the source data to be converted. Rather, as stated above, the similarity between features of the source data and one or more portions of external data may be utilized to select the appropriate portion of external source data to be applied. Furthermore, the unsupervised learning process employing the indexed string matching may not require the need for structured data or training data to be provided to the unsupervised learning tool from the source data to be converted as a guide in the conversion process. Rather, the sole source of rules or other conversion context may be imparted based on the external information to be applied to the source data such that the context of the source data may not need to be resolved at all.

In an embodiment, any or all of the foregoing unsupervised machine learning processes may be performed locally (i.e., on premise with relation to the owner or originator of the data) or may be supplied to a cloud computing environment for processing. In this regard, for example, at least a portion of the foregoing process may be performed in a distributed manner across a plurality of hardware locales (i.e., "in the cloud"). Furthermore, at least a portion of the unsupervised machine learning may be performed on premise. For instance, the data may undergo a portion of the processing described herein (e.g., standardization and/or classification as an example) on premise prior to be provided to a cloud computing environment for matching to external data for use in conversion of the data. Once the matching environment has identified a suitable portion or portions of external information to be applied for a conversion, the actual conversion of the data may be performed locally or in a cloud computing environment. As such, given the advantages associated with accessing large amounts of external information for matching to source strings, a cloud computing environment that leverages large amounts of computing and memory resources may provide benefits in identifying matched external information (e.g., public or private schemas) for use in conversion.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for use in operating a computer-based tool for converting data from a first form to a second form, comprising:
   identifying, using the computer-based tool, a set of data to be converted from the first form to the second form, wherein the set of data is contextually indeterminate;
   accessing, using the computer-based tool, a plurality of schema that each include one or more conversion rules for converting data within a particular context of the data, wherein the one or more conversion rules are at least partially based on the particular context;
   comparing, using the computer-based tool, the set of data to at least a portion of the plurality of schema using indexed string matching that is performed independently of the context of the set of data and the plurality of schema;
   selecting, using the computer-based tool, a selected schema from the plurality of schema based at least partially on the comparing; and
   applying the one or more conversion rules of the selected schema to the set of data to convert the set of data from the first form to the second form.

2. A method according to claim 1, wherein the accessing comprises identifying a public schema, including conversion rules generally applicable to the subject matter area independent of any entity or group of entities associated with the set of data, that establishes a structure for understanding at least a portion of a subject matter area.

3. A method according to claim 2, wherein the public schema involves an accepted public definition of a semantic object.

4. A method according to claim 1, wherein the accessing comprises identifying a private schema, including conversion rules specific to an entity or group of entities less than the public as a whole, that establishes a structure for understanding at least a portion of a subject matter.

5. The method according to claim 1, wherein the indexed string matching comprises:
   representing each of the set of data and the plurality of schema as one or more features, wherein the set of data is represented as source features and the plurality of schema are represented as target features; and
   compiling an index corresponding to the target features, wherein the index comprises a mapping for each target feature to each of the plurality of schema containing the target feature;
   determining a subset of the plurality of schema for which a similarity metric is to be calculated in relation to the set of data, wherein the subset of the plurality of schema comprises less than the entirety of the plurality of schema; and
   calculating a similarity metric for the set of data relative to the subset of the plurality of schema, wherein the similarity metric is at least partially based on commonality between the target features and the source features.

6. The method according to claim 5, wherein the method further comprises:
   establishing, using the computer-based tool, a minimum similarity metric between the source string and the target strings; and
   eliminating, using the computer based tool, source features from consideration in the determining operation at least partially based on the minimum similarity metric, wherein the eliminated source features correspond to target features of the subset plurality of schema that are not capable of exceeding the minimum similarity metric.

7. The method according to claim 5, wherein the method further comprises:
   establishing, using the computer-based tool, a minimum similarity metric between the source string and the target strings; and
   removing, using the computer-based tool, at least one mapping from the index at least partially based on the minimum similarity metric, wherein the removing operation includes determining a portion of the target features that can be removed from the index such that only target features are included in the index that correspond with ones of the plurality of schema capable of exceeding the minimum similarity metric.

8. A method for use in operating a computer-based tool for converting data from a first form to a second form, comprising the steps of:
identifying a set of data to be converted from said first form to said second form;
representing each one of the plurality of schema as one or more target features;
compiling an index corresponding to the plurality of schema, wherein the index comprises a mapping for each target feature to each of the plurality of schema containing the target feature;
representing the set of data to be converted as one or more source features;
accessing a plurality of schema that are each based on external knowledge of at least one subject matter area independent of analysis of a particular data set to be converted, each one of the plurality of schema including one or more conversion rules for use in converting data within a corresponding context of a subject matter area of the schema;
determining a subset of the plurality of schema for which a similarity metric is to be calculated, wherein the subset of the plurality of schema comprises less than the entirety of the plurality of schema;
calculating a similarity metric for the set of data to be converted relative to the subset of the plurality of schema, wherein the similarity metric is at least partially based on commonality between the target features and the source features;
selecting at least one selected schema of the plurality of schema at least partially based on the similarity metric; and
using an included conversion rule of the sat least one selected schema in a process for converting the set of data from the first form to the second form.

9. The method according to claim 8, wherein the subset of the plurality of schema for which a similarity metric is calculated at least comprises one target feature in common with at least one source feature.

10. The method according to claim 9, further comprising:
assigning a feature weight to each feature, wherein the feature weight of the feature corresponds to a measure of the contribution of the feature to the similarity metric, and wherein the source features are assigned a source feature weight and the target features are assigned a target feature weight, and wherein the source feature weight is different than the target feature weight.

11. The method according to claim 10, wherein the feature weight is at least partially based on a frequency of the feature in the plurality of schema, wherein a feature having a frequency above an upper threshold or a frequency below a lower threshold is given a reduced frequency weight.

12. The method according to claim 8, wherein the selecting step is performed without reference to any particular subject matter or context of the data to be converted or the subject matter or context of the plurality of schema.

13. The method as set forth in claim 8, wherein said step of accessing comprises identifying a public schema, including conversion rules generally applicable to said subject matter area independent of any entity or group of entities associated with said set of data, that establishes a structure for understanding at least a portion of the subject matter area.

14. The method as set forth in claim 13, wherein said public schema involves an accepted public definition of a semantic object.

15. The method as set forth in claim 8, wherein said step of accessing comprises identifying a private schema, including conversion rules specific to an entity or group of entities less than the public as a whole, that establishes a structure for understanding at least a portion of the subject matter area.

16. The method as set forth in claim 1, wherein said step of using comprises executing logic to interpret the data to be converted in view of the included conversion rule as to identify an object, an attribute or an attribute value of at least a portion of the data to be converted.

17. The method as set forth in claim 1, wherein said step of using comprises
performing a comparison of the object, the attribute or the attribute value to a corresponding set of objects, attributes, or attribute values defined by said first schema.

18. The method of claim 17, wherein the comparison comprises utilizing a similarity metric corresponding to the object, the attribute, or the attribute value with respect to a corresponding set of objects, attributes, or attribute values defined by the first schema.

19. A system for use in converting contextually indeterminate data from a first form to a second form, comprising:
a feature module, comprising non-transitory computer readable instructions stored in a memory that are accessible and executable by a processor of a computer-based string analysis tool, that is operable to represent each of a plurality of schema as a plurality of schema features;
an indexing module, comprising non-transitory computer readable instructions stored in a memory that are accessible and executable by a processor of the computer-based string analysis tool, operable to compile an index comprising a mapping, wherein the mapping correlates each schema feature to each one of the plurality of schema containing the schema feature;
a similarity metric module, comprising non-transitory computer readable instructions stored in a memory that are accessible and executable by a processor of the computer-based string analysis tool, that is operable to calculate a similarity metric between a set of data to be converted from the first form to the second form, wherein the set of data is contextually indeterminate and each of a selected portion of the plurality of schema has at least one common feature to the source string, wherein the similarity metric comprises a quantitative value regarding the commonality of features between the set of data and each of the selected portion of the plurality of schema;
an optimization module, comprising non-transitory computer readable instructions stored in a memory that are accessible and executable by a processor of the computer-based string analysis tool, that is operable to determine the selected portion of the plurality of schema for which a similarity metric is calculated based at least partially on elimination of features from consideration based on a minimum similarity metric threshold; and
a conversion module, comprising non-transitory computer readable instructions stored in a memory that are accessible and executable by a processor of the computer-based string analysis tool, that is operable to select, based on the similarity metric between the set of data and each of the selected portion of the plurality of schema to identify at least one selected schema, wherein the conversion module is operable to apply a contextually dependent conversion rule of the selected schema to the set of data to covert the set of data from the first form to the second form.

20. The system of claim 19, wherein the conversion module operates independently of the context of the set of data to be converted.

* * * * *